United States Patent
Taniguchi et al.

(10) Patent No.: US 6,988,010 B2
(45) Date of Patent: Jan. 17, 2006

(54) SYSTEM AND METHODS FOR PROVIDING A PORTABLE OBJECT MANAGEMENT TERMINAL

(75) Inventors: Shinya Taniguchi, Suwa (JP); Yoshiki Fukui, Suwa (JP); Naruhide Kitada, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 457 days.

(21) Appl. No.: 10/245,583

(22) Filed: Sep. 18, 2002

(65) Prior Publication Data

US 2004/0054430 A1 Mar. 18, 2004

(51) Int. Cl.
*G05B 18/18* (2006.01)

(52) U.S. Cl. .............................. 700/65; 700/66; 700/52; 700/53; 700/17; 700/83; 701/2; 701/200; 701/300; 709/231; 709/232; 709/217

(58) Field of Classification Search .................. 700/65, 700/66, 83, 17, 52, 53; 701/2, 200, 300; 709/231, 709/232, 217
See application file for complete search history.

(56) References Cited

U.S. PATENT DOCUMENTS 6,389,153 B1 * 5/2002 Imai et al. .................. 382/106
6,674,534 B2 * 1/2004 Norita et al. ............... 356/601
6,720,949 B1 * 4/2004 Pryor et al. ................. 345/158
2004/0051744 A1 * 3/2004 Fukui et al. ................ 345/848

FOREIGN PATENT DOCUMENTS

| JP | A 5-143274 | 6/1993 |
| JP | 10-013720 | 1/1998 |
| JP | A 11-142973 | 5/1999 |
| JP | A 11-177933 | 7/1999 |
| JP | 2000-152125 | 5/2000 |

* cited by examiner

*Primary Examiner*—Ramesh Patel
(74) *Attorney, Agent, or Firm*—Oliff & Berridge, PLC

(57) ABSTRACT

The invention provides an operation control system which is capable of allowing users to easily operate a controlled device over different control ranges, respectively. More particularly, when cards are brought close to a projector, a virtual object management device detects an area-in state of each virtual object of the cards with respect to a virtual object of the projector, and notifies the projector of the area-in state of the card service. The projector, upon receiving the card service area-in notification, transmits a service linkage initiation request to a card management device. Upon receiving an operation command transmitted in response to the initiation request transmission, the projector controls a projection process in response to the received operation command. The card management device transmits the operation command to the projector upon receiving the service linkage initiation request.

16 Claims, 18 Drawing Sheets

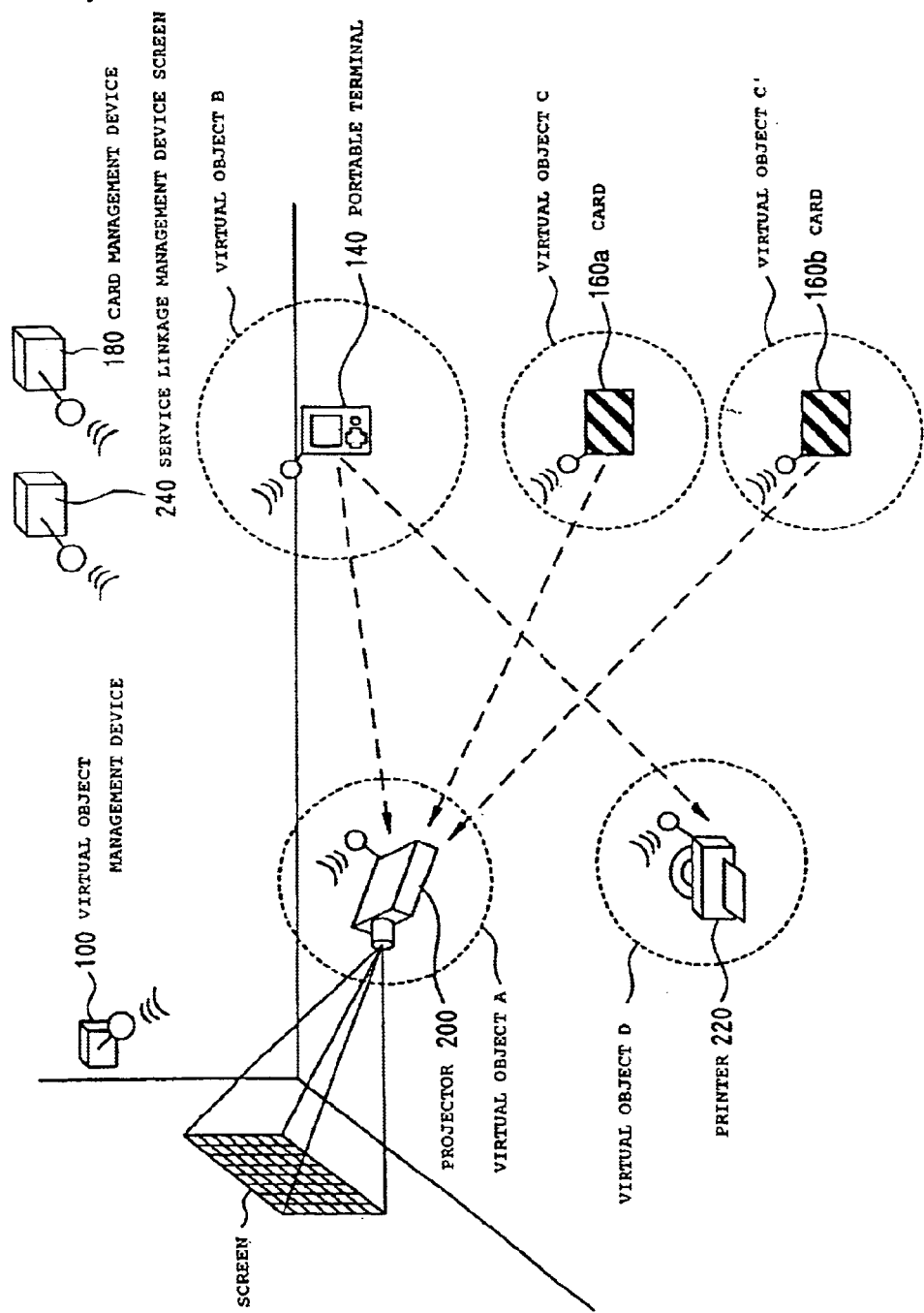
[FIG. 1]

[FIG. 2]
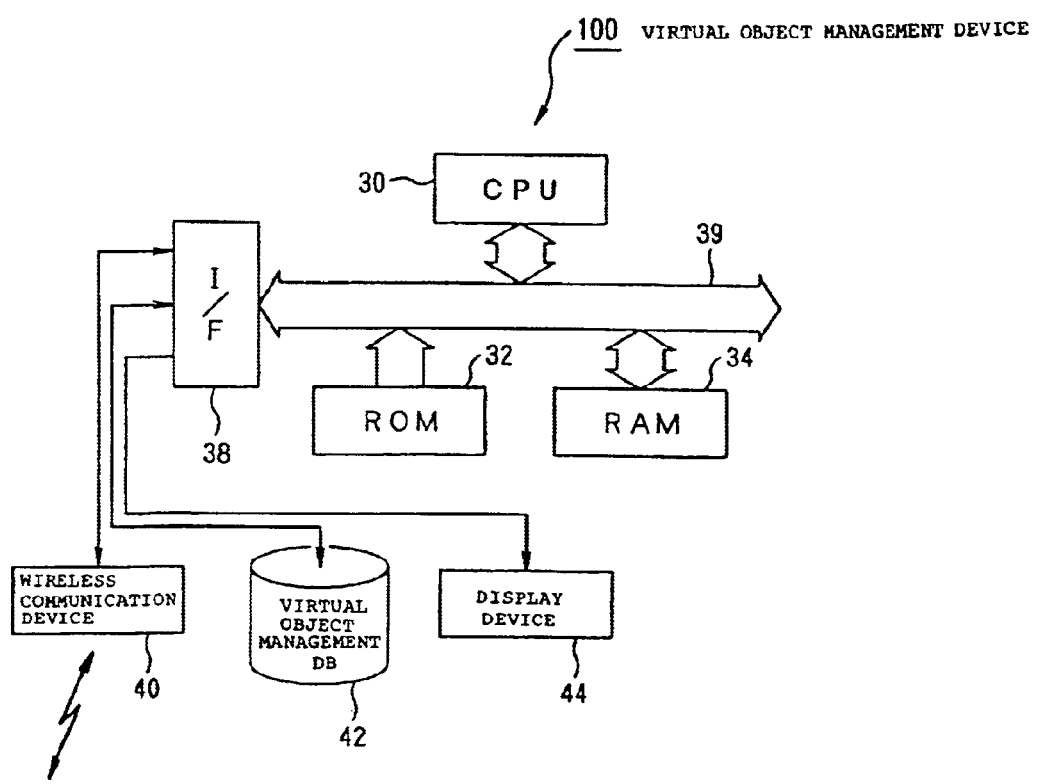

[FIG. 3]

400 VIRTUAL OBJECT MANAGEMENT TABLE

| SERIAL NUMBER | SERVICE TYPE | SERVICE ID | ORIGIN (X, Y, Z) | SHAPE | RANGE (m) | AREA-IN MANAGEMENT INFORMATION (Ex. 0001, 0002, --) |
|---|---|---|---|---|---|---|
| 1 | PROJECTOR SERVICE | 0001 | 10,50,20 | SPHERE | 2 | |
| 2 | PDA SERVICE | 0002 | 30,40,20 | SPHERE | 1 | 0001 |
| 3 | PRINTER SERVICE | 0003 | 30,40,20 | SPHERE | 2 | |
| 4 | CARD SERVICE | 0004 | 30,40,20 | SPHERE | 2 | |

402, 404, 406 — SERVICE INFORMATION
408, 410, 412 — OBJECT INFORMATION
414

[FIG. 4]
500 COMMUNICATION INFORMATION REGISTRATION TABLE
| SERVICE ID | SERVICE TYPE | COMMUNICATION INFORMATION |
|---|---|---|
| 0001 | PROJECTOR SERVICE | COMMUNICATION OBJECT DATA A |
| 0002 | PDA SERVICE | COMMUNICATION OBJECT DATA B |
| 0003 | PRINTER SERVICE | COMMUNICATION OBJECT DATA C |
| 0004 | CARD SERVICE | COMMUNICATION OBJECT DATA D |
502, 504, 506
[FIG. 5]
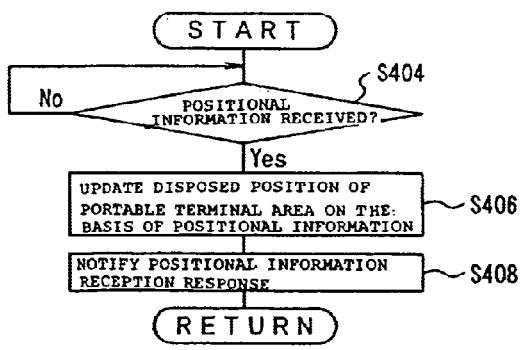

[FIG. 6]
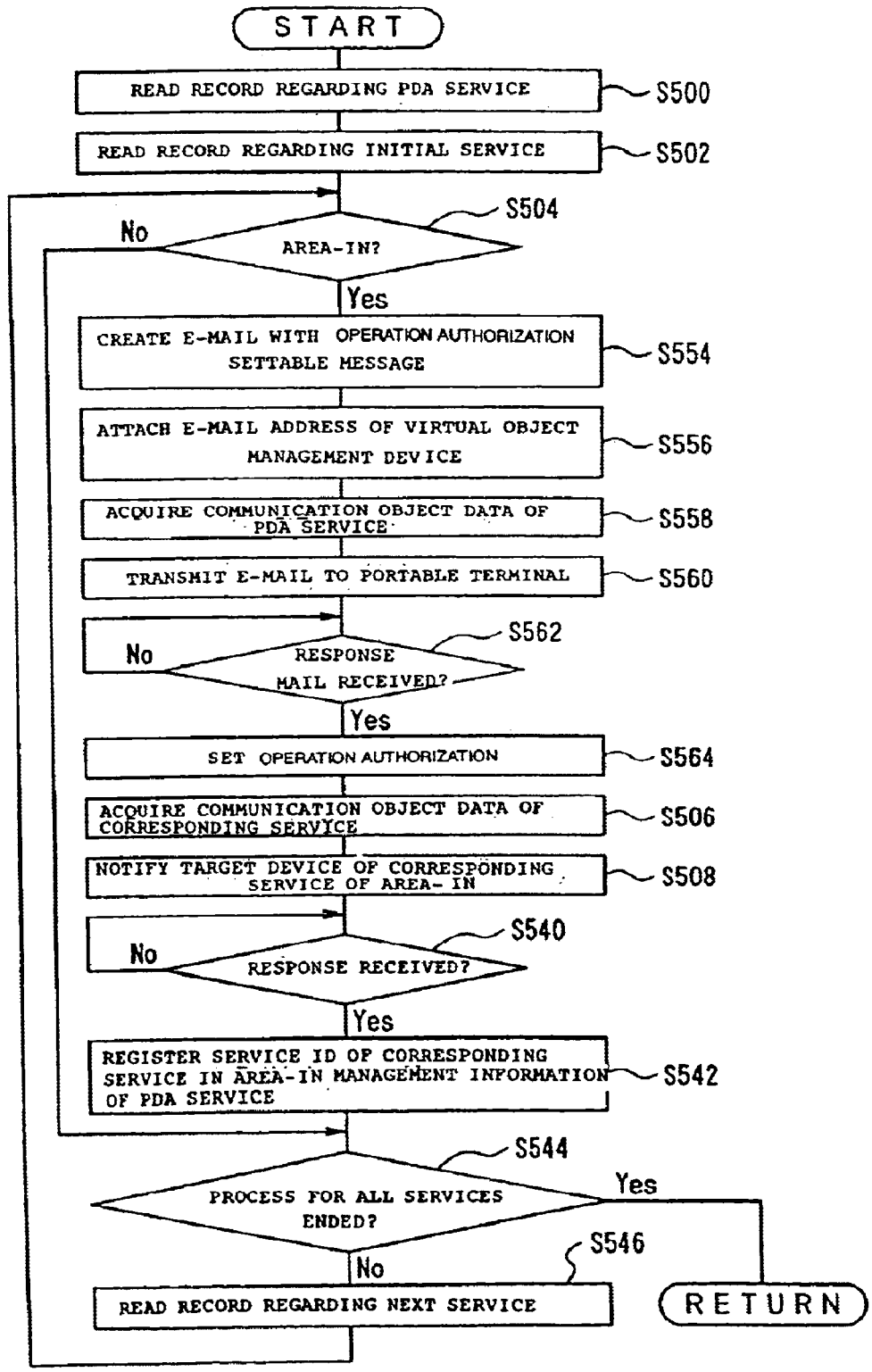

[FIG. 7]
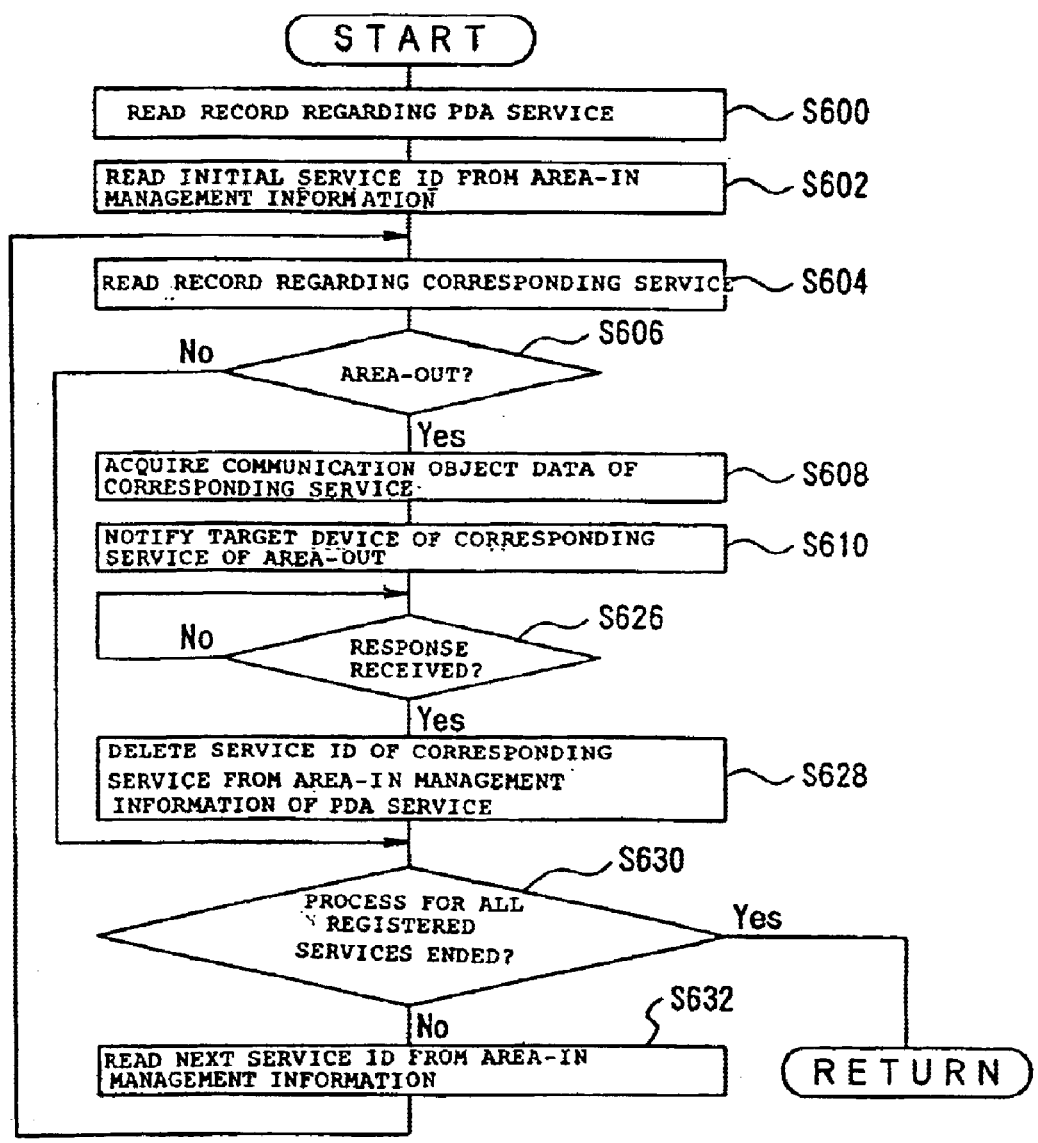

[FIG. 8]
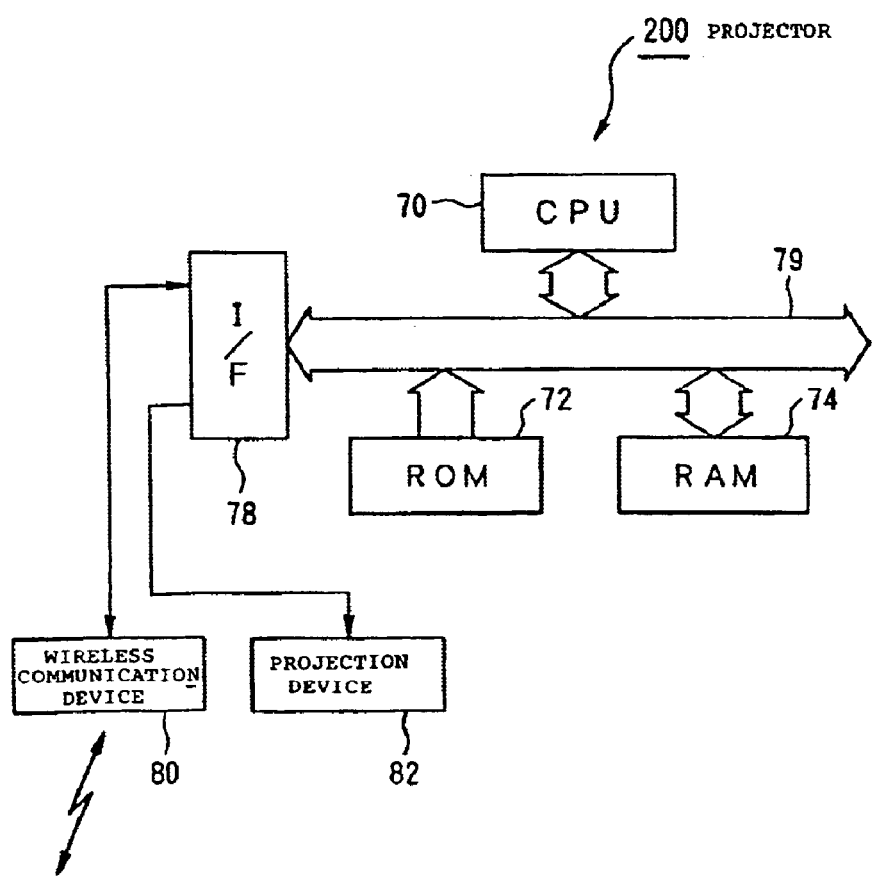

[FIG. 9]
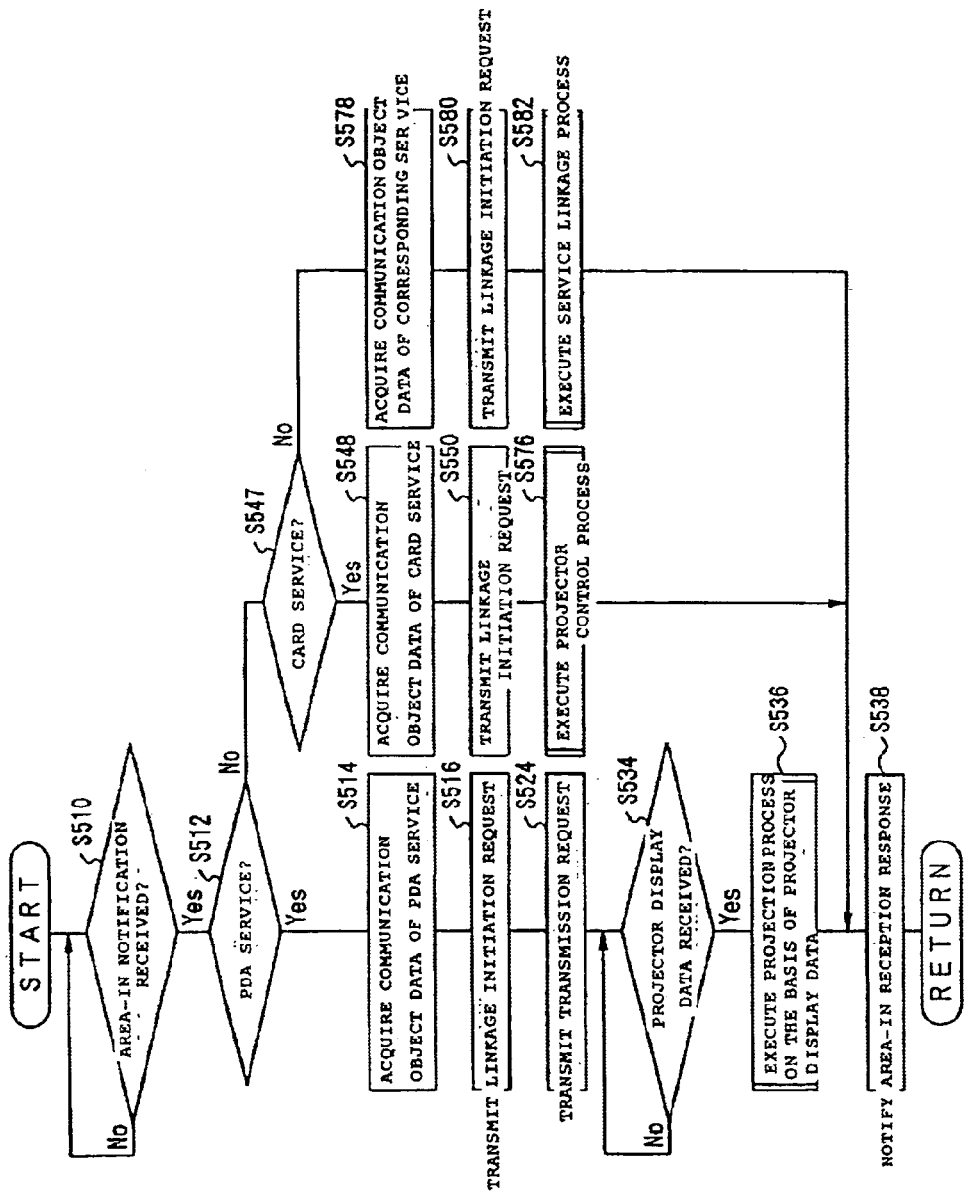

[FIG. 10]
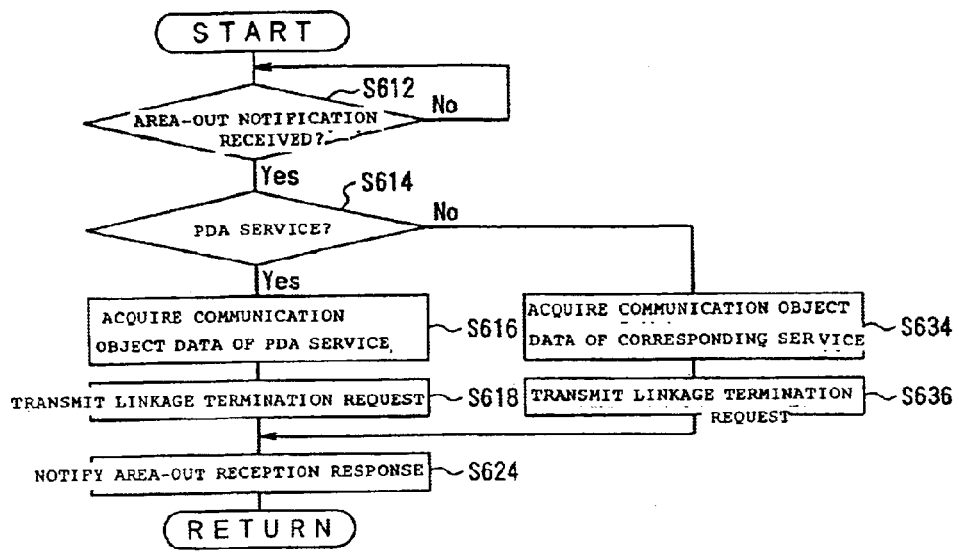
[FIG. 11]
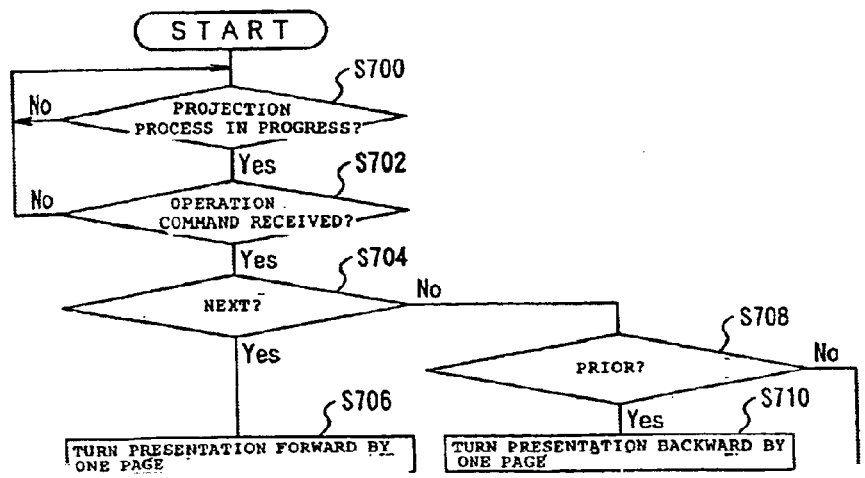

[FIG. 12]
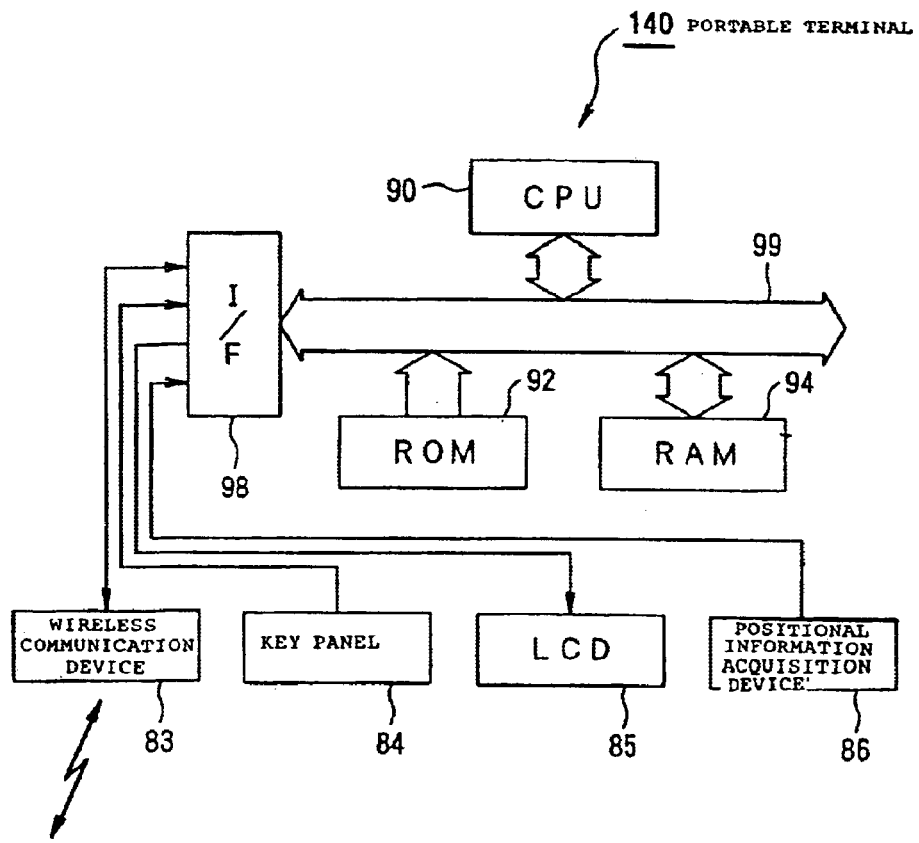
[FIG. 13]
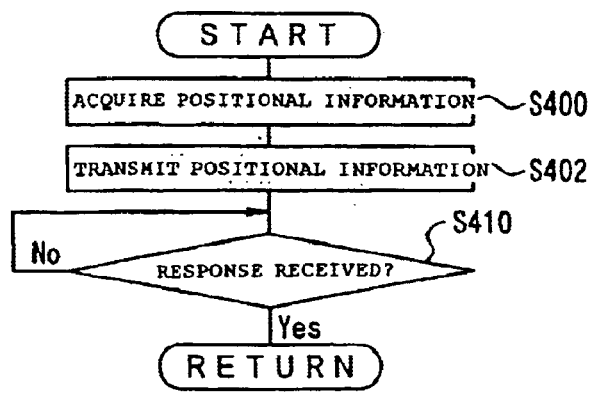

[FIG. 14]
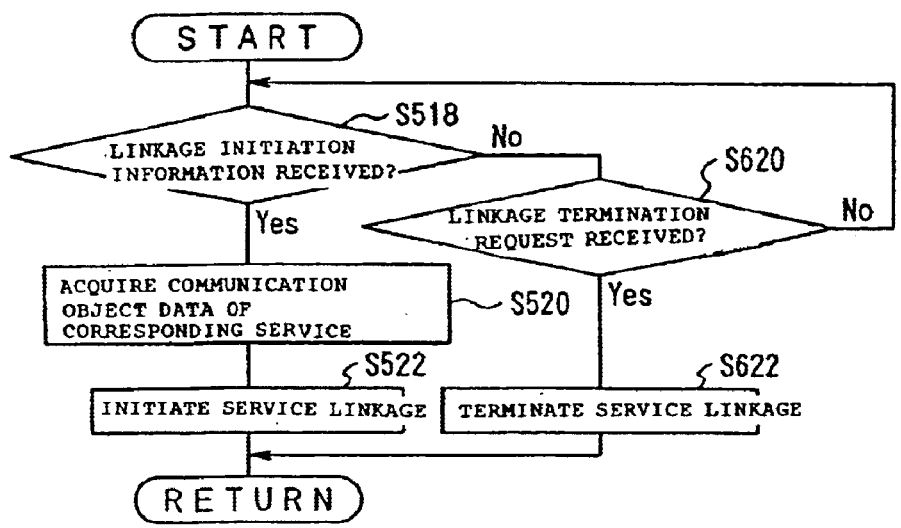
[FIG. 15]
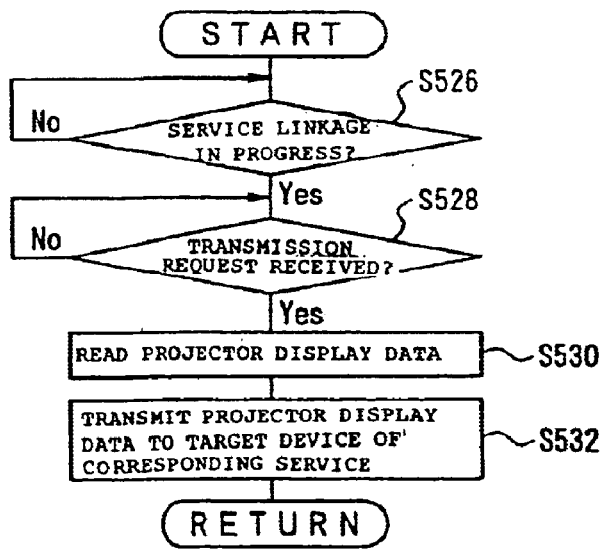

[FIG. 16]
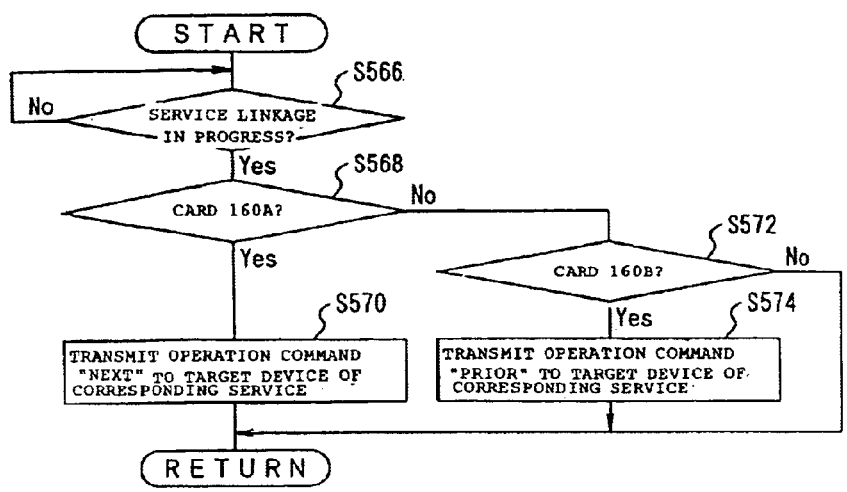
[FIG. 17]
EXAMPLE OF PROJECTOR OPERATION BY CARD
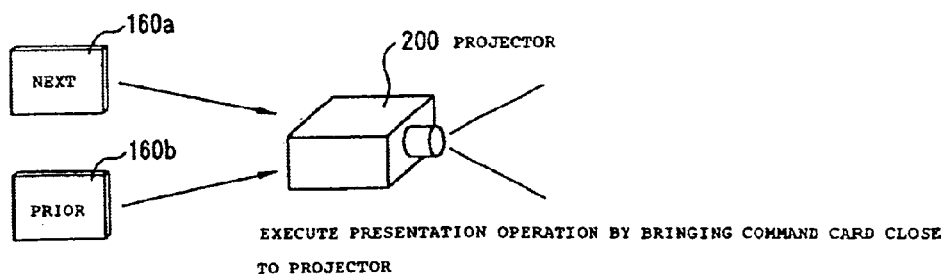
EXECUTE PRESENTATION OPERATION BY BRINGING COMMAND CARD CLOSE TO PROJECTOR

[FIG. 18]
EXAMPLE OF PRINTER OPERATION BY CARD
① BRING THREE CARDS CLOSE TO PRINTER
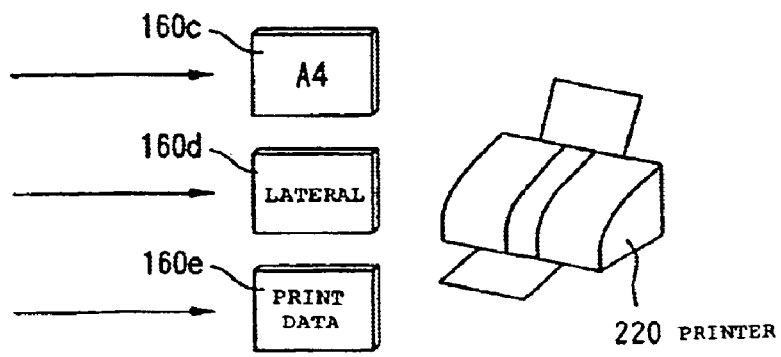
② PRINT PRINT DATA ON A4 SIZE IN LATERAL DIRECTION
[FIG. 19]
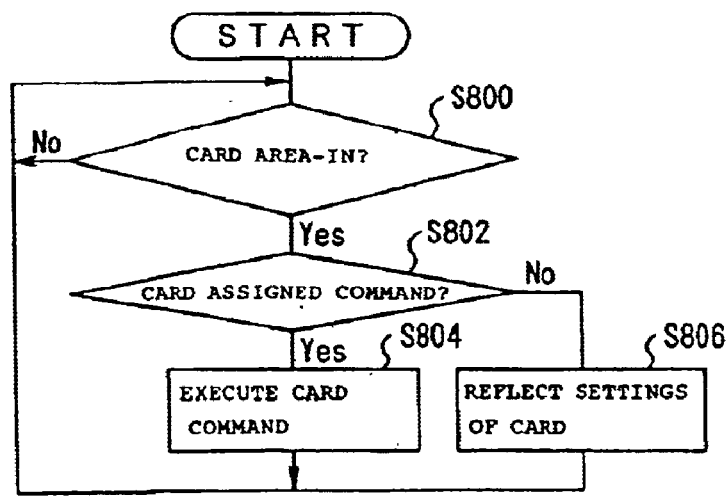

[FIG. 20]
EXAMPLE OF PROJECTOR/PRINTER LINKAGE
① DISPLAY OF DATA BY PROJECTOR
② APPROACH OF PRINT CARD
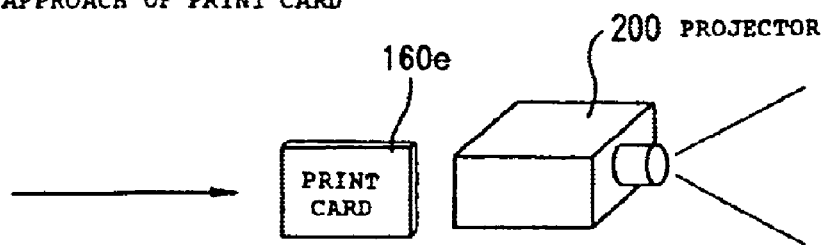
③ PRINTER SEARCH
④ PRINT COMMAND TO PRINTER
(PROJECTOR SCREEN DATA TRANSMISSION)
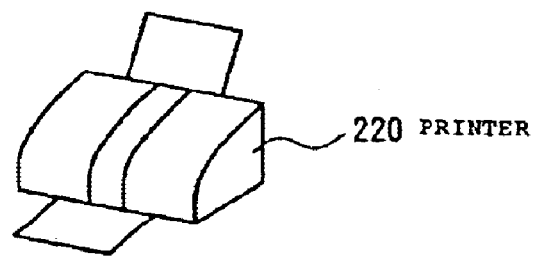
⑤ PROJECTOR SCREEN PRINT

[FIG. 21]
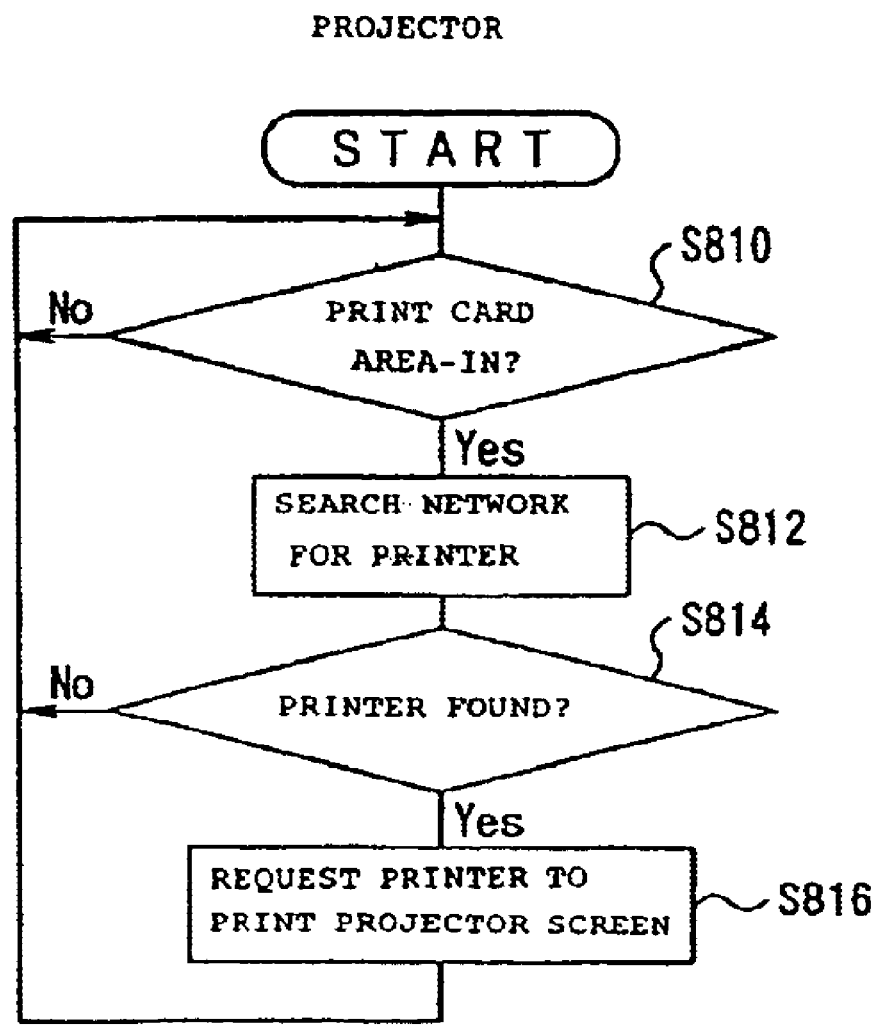

[FIG. 22]
EXAMPLE OF DEVICE FUNCTION ACQUIRABLE CARD
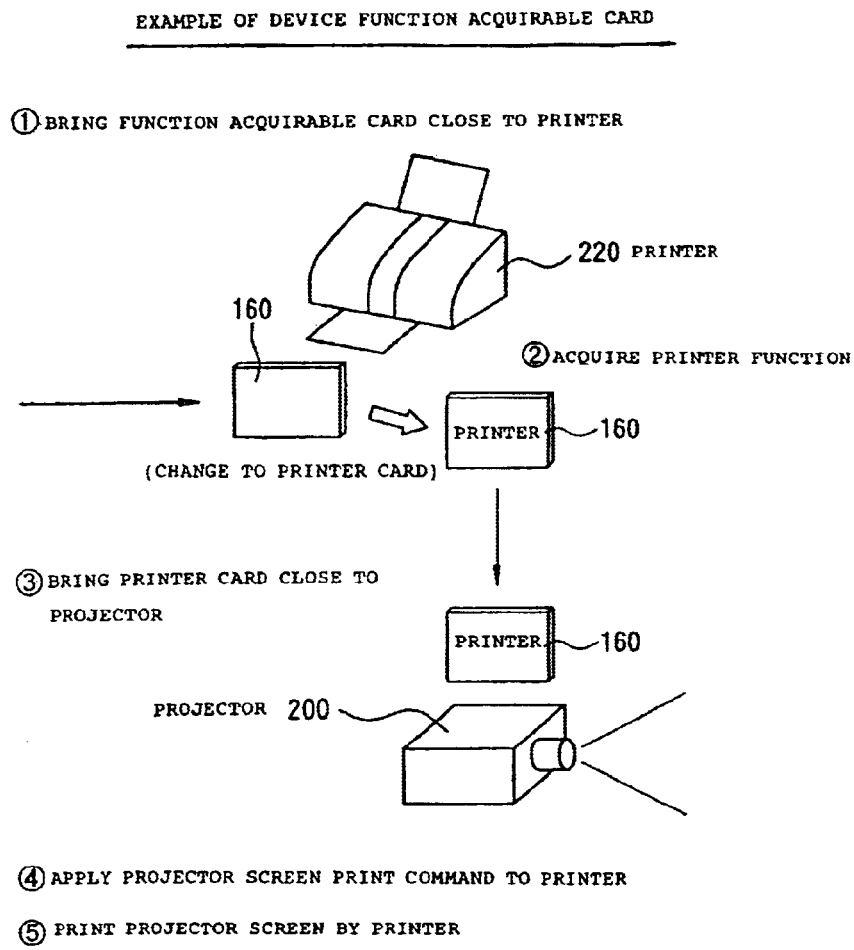
④ APPLY PROJECTOR SCREEN PRINT COMMAND TO PRINTER
⑤ PRINT PROJECTOR SCREEN BY PRINTER
[FIG. 23]
EXAMPLE OF DEVICE FUNCTION ACQUIRABLE CARD
PRINTER
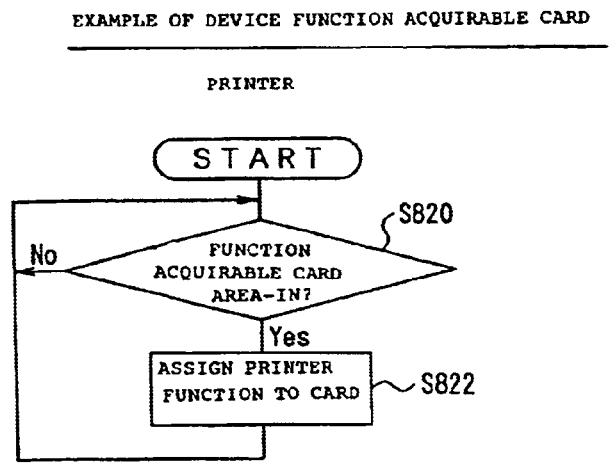

[FIG. 24]
EXAMPLE OF ASSIGNMENT OF DIFFERENT COMMANDS TO FRONT AND BACK SURFACES OF CARD
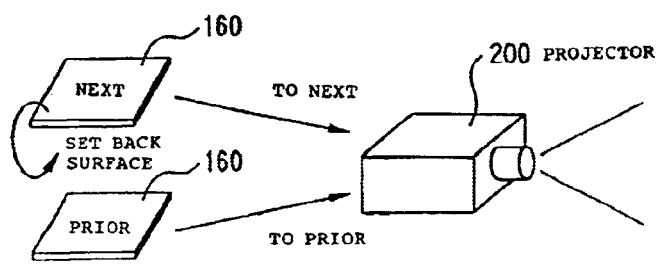
[FIG. 25]
CASE OF DIFFERENT COMMANDS
PROJECTOR
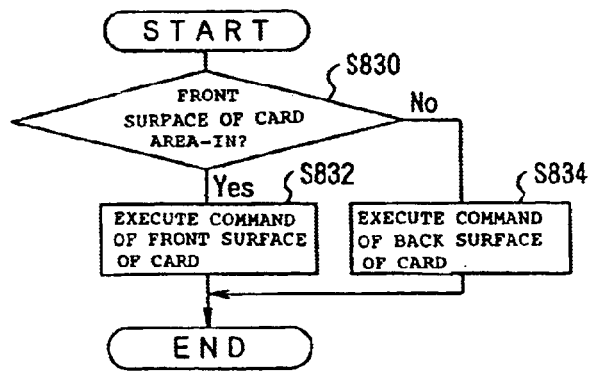

[FIG. 26]
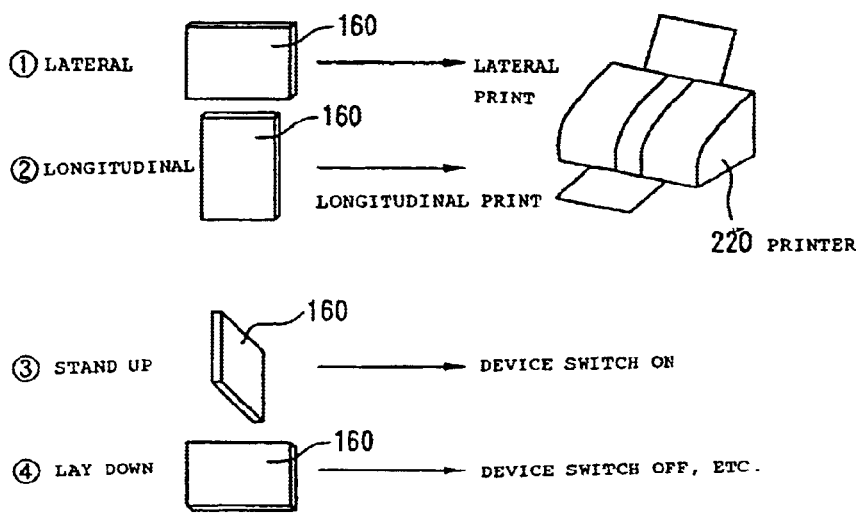

SYSTEM AND METHODS FOR PROVIDING A PORTABLE OBJECT MANAGEMENT TERMINAL

BACKGROUND OF THE INVENTION

1. Field of Invention

The present invention relates to a system, terminal, and program for allowing virtual objects corresponding respectively to an output device, such as a projector or the like, and a portable terminal, arranging the virtual objects respectively in a virtual space corresponding to a real space, and providing an output service by the output device on the basis of a positional relation between the virtual objects. More particularly, the invention relates to an operation control system, an output service provision system, a portable object management terminal, a portable terminal, a portable object management terminal program, and a portable terminal program wherein users can easily operate a controlled device. The control ranges can be differed for each one of users.

2. Description of Related Art

It is common that a user can operate a controlled device, such as a projector or the like, by operating an operating panel installed in the controlled device. Besides, the controlled device can be connected with a portable terminal, such as a remote controller, to communicate with the portable terminal in a wireless manner, and the user can remotely operate the controlled device by operating an operating panel of the portable terminal.

Meanwhile, conventional systems for provision of a service responsive to a user's movement are, for example, an information presenting apparatus disclosed in Japanese laid-open Patent Application No. HEI 10-13720 (referred to hereinafter as a first example) and a head mount display apparatus disclosed in Japanese laid-open Patent Application No. 2000-152125 (referred to hereinafter as a second example).

In the first example, detectors 103 and 104 detect the position and direction of a camera 101 through a global positioning system (GPS), respectively, and a user specifies an object in an image displayed on a display or finder 108. A controller 106 obtains positional information of the specified object by performing a computing operation on the basis of the position of the specified object, and the detected position and direction. The controller 106 then extracts attribute data of the specified object corresponding to the obtained positional information from a map data storage unit 107 and displays the extracted attribute data on the display or finder 108, or outputs it in a speech synthesis manner. As a result, the first example can readily obtain the attribute data of an object in a displayed image and present it to the user.

In the second example, an icon image is displayed on an image output unit 5 in response to an input from an operation input unit 6 such that it is positioned on a line of sight detected by a sight line detector 8. The overlap of the icon image with the actual field of view seen from a window is viewed by the eyes of an operator. The operator views along their line of sight to a desired portion in the view field and determines their focus at the desired portion by applying a command through the operation input unit 6. For example, if the operator views actual sentences before their eyes and specifies a specific area in the sentences, an image processor 7 reads sentences or words in the specified area from image information inputted from a CCD camera 3, translates the read sentences or words in a given language and displays the resulting data on the image output unit 5.

As a result, the second conventional example can select and specify an object in the actual field of view according to the movement of the operator's line of sight and process image information in the view field using the line of sight as input means.

SUMMARY OF THE INVENTION

However, the above-mentioned controlled device operating method has a disadvantage in that the user has to personally operate the operating panel of the controlled device or portable terminal. Further, some structure or operation contents of the operating panel may cause the user to have difficulty in operating the operating panel. Moreover, because the operating panel has a uniform structure, the panel can be operated equally by any user, resulting in difficulty in managing and maintaining security of the controlled device. Approaches to this problem may be the design of an operating panel based on purpose for use by each user, or the limitation of an operating range based on entry of a password or the like. The former can be impracticable in terms of cost, and the latter results in greater complexity in operation.

On the other hand, because the first example is configured to, when a user specifies an object in an image displayed on the display or finder 108, provide the attribute data of the specified object to the user, the user cannot obtain the attribute data useful thereto if they do not take an active action even though, for example, an object corresponding to the useful attribute data is in the vicinity of a place where the user is currently located.

And like the first example, because the second example is configured to conduct a translation when a user views sentences before their eyes and specifies a specific area in the sentences, the user cannot receive a translation service if they do not take an active action.

Therefore, the present invention has been made in view of the above problems, and it is an object of the present invention to provide an operation control system, an output service provision system, a portable object management terminal, a portable terminal, a portable object management terminal program, and a portable terminal program wherein users can easily operate a controlled device and the control ranges can be differed for each one of users, respectively. It is another object of the present invention to provide a system for providing a movement-based dynamic service, particularly an operation control system, an output service provision system, a portable object management terminal, a portable terminal, a portable object management terminal program, and a portable terminal program which can allow a user to easily receive a provided service.

In accordance with the present invention, the above and other objects can be accomplished by the provision of an operation control system for allowing a first virtual object corresponding to a controlled device, the controlled device being operated in response to a given control command, and allowing a second virtual object corresponding to a mobile object, respectively, arranging the first virtual object in a virtual space corresponding to a real space and arranging the second virtual object at a position of the mobile object in the virtual space or the vicinity thereof, respectively, and operating the controlled device corresponding to the first virtual object on the basis of a positional relation between the first virtual object and the second virtual object. The operation control system can include a first storage device for storing first object information regarding a shape and disposed position of the first virtual object in a manner corresponding to the controlled device, a second storage device for storing second object information regarding a shape and disposed position of the second virtual object in a manner corresponding to the mobile object, a control command storage device for storing control commands for the operation of the controlled device in a manner corresponding to the mobile object, and positional information acquisition device for acquiring positional information specifying the position of the mobile object. The second object information in the second storage device is updated on the basis of the positional information acquired by the positional information acquisition device, and giving a control command corresponding to the mobile object as the second virtual object, among the control commands in the control command storage device, to the controlled device as the first virtual object upon determining, on the basis of the first object information in the first storage device and the second object information in the second storage device, that an area specified by the shape and disposed position of the first virtual object is overlapped with an area specified by the shape and disposed position of the second virtual object. The controlled device can be operated in response to the given control command.

With this structure, the positional information is acquired by the positional information acquisition device, and the second object information in the second storage device is updated on the basis of the acquired positional information. A determination is made, on the basis of the first object information in the first storage device and the second object information in the second storage device, as to whether the area specified by the shape and disposed position of the first virtual object is overlapped with the area specified by the shape and disposed position of the second virtual object. That is, if the mobile object is brought close to the area of the first virtual object or the vicinity thereof, the two areas are determined to have overlapped. If it is determined that the two areas have overlapped, a control command corresponding to the mobile object as the second virtual object, among the control commands in the control command storage device, is given to the controlled device as the first virtual object. The controlled device is operated in response to the given control command. Here, each virtual object can have a logical shape and disposed position in the virtual space corresponding to the real space. For example, each virtual object may have a spherical shape with a radius of about 1 [m] about its disposed position, a cubic shape with each side of about 1 [m] about its disposed position, a shape modeled on a natural thing or living thing, or any other shape. Moreover, each virtual object is not limited to a three-dimensional shape, and may have a planar shape. This can be similarly applied to an output service provision system.

The mobile object may be a mobile object in the real space or a mobile object in the virtual space. In the former, the mobile object may be a portable terminal or vehicle. If the portable terminal or vehicle is applied as the mobile object, an output service responsive to the user's location can be provided. In the latter, the mobile object may be a mobile object on a computer simulation or a mobile object on a game. If the computer simulation is applied as the mobile object, an output service responsive to the position of the mobile object in the virtual space can be provided.

The first storage device may store the first object information through any means and at any time, or pre-store it. Alternatively, the first storage device may store the first object information in response to an external input, etc. during the operation of the present system, without pre-storing the first object information. This is similarly applied to the storage of the second object information in the second storage device and the storage of the control commands in the control command storage device. Also, this can be similarly applied to an output service provision system.

The present system may be implemented as a single apparatus or as a network system having a plurality of terminals interconnected in a communicatable manner. In the latter, each constituent element may belong to any of the plurality of terminals as long as it is communicatably connected.

The positional information acquisition device may be provided in, for example, a communication terminal to which the mobile object is communicatably connected, to acquire the positional information by measuring the position of the mobile object. Alternatively, the mobile object may measure the position thereof using a GPS, etc., or the communication terminal may acquire the positional information by calculating it on the basis of measurement information from the mobile object. And a base station to which the mobile object is connected may measure the position of the mobile object, or the communication terminal may acquire the positional information by calculating it on the basis of measurement information from the base station.

Further, in accordance with the present invention, there can be provided an output service provision system for interconnecting a virtual object management terminal managing virtual objects, an output device, and a portable object management terminal managing a portable object in a communicatable manner, allowing a first virtual object corresponding to the output device and allowing a second virtual object corresponding to the portable object, respectively, arranging the first virtual object in a virtual space corresponding to a real space and arranging the second virtual object at a position of the portable object in the virtual space or the vicinity thereof, respectively, and providing an output service associated with an output of the output device corresponding to the first virtual object on the basis of a positional relation between the first virtual object and the second virtual object. The output service provision system can include a positional information acquisition device for acquiring positional information specifying the position of the portable object. The virtual object management terminal can include a first storage device for storing first object information regarding a shape and disposed position of the first virtual object in a manner corresponding to the output device, and a second storage device for storing second object information regarding a shape and disposed position of the second virtual object in a manner corresponding to the portable object, and is adapted to update the second object information in the second storage device on the basis of the positional information acquired by the positional information acquisition device, and transmit a provision request to provide the output service associated with the output of the output device corresponding to the first virtual object, upon determining, on the basis of the first object information in the first storage device and the second object information in the second storage device, that an area specified by the shape and disposed position of the first virtual object is overlapped with an area specified by the shape and disposed position of the second virtual object. The portable object management terminal can include a control command storage device for storing control commands for the operation of the output device in a manner corresponding to the portable object, and is adapted to, upon receiving the provision request, transmit a control command corresponding to the portable object associated with the received provision request, among the control commands in the control command storage device, to the output device associated with the received provision request. The output device, upon receiving the transmitted control command, can be operated in response to the received control command.

With this structure, the positional information can be acquired by the positional information acquisition device, and the virtual object management terminal updates the second object information in the second storage device on the basis of the acquired positional information. A determination is made, on the basis of the first object information in the first storage device and the second object information in the second storage device, as to whether the area specified by the shape and disposed position of the first virtual object is overlapped with the area specified by the shape and disposed position of the second virtual object. In other words, if the portable object is brought close to the area of the first virtual object or the vicinity thereof, the two areas are determined to have overlapped. If it is determined that the two areas have overlapped, the virtual object management terminal transmits the provision request to provide the output service associated with the output of the output device corresponding to the first virtual object.

The portable object management terminal, upon receiving the provision request, can transmit a control command corresponding to the portable object associated with the received provision request, among the control commands in the control command storage device, to the output device associated with the received provision request.

The output device, upon receiving the transmitted control command, is operated in response to the received control command.

The transmission of the provision request signifies that the virtual object management terminal transmits the provision request directly or indirectly to the portable object management terminal. For the indirect transmission, for example, under the condition that the virtual object management terminal is commnunicatably connected with an external terminal, the virtual object management terminal may transmit the provision request to the portable object management terminal via the external terminal. That is, the virtual object management terminal may transmit the provision request in cooperation with one external terminal or a plurality of external terminals.

The positional information acquisition device may be provided in, for example, a communication terminal to which the portable object is communicatably connected, to acquire the positional information by measuring the position of the portable object. Alternatively, the portable object may measure the position thereof using a GPS, and the like, or the communication terminal may acquire the positional information by calculating it on the basis of measurement information from the portable object. And a base station to which the portable object is connected may measure the position of the portable object, or the communication terminal may acquire the positional information by calculating it on the basis of measurement information from the base station. Alternatively, the positional information acquisition device may be installed in any of the virtual object management terminal, the output device, the portable object, the portable object management terminal, and other external terminals communicatably connected to the virtual object management terminal.

The portable object management terminal may be communication equipment which is connected to one-side ends of communication paths with the virtual object management terminal and output device, and basically has a server function. Alternatively, the portable object management terminal may be configured to have both a client function and server function.

Further, in accordance with the present invention, there is provided an output service provision system wherein the transmitted control command is a page turning command for a page turning operation. The output device can include a display device, and is adapted to, upon being given display data, conduct a page-unit display on the display device on the basis of the given display data, and to, upon receiving the page turning command, turn pages displayed on the display device in response to the received page turning command.

With this structure, the output device, upon being given display data, conducts a page-unit display on the display device on the basis of the given display data. Under this condition, if it is determined that the area of the first virtual object is overlapped with the area of the second virtual object as the portable object is brought close to the area of the first virtual object or the vicinity thereof, the portable object management terminal transmits a page turning command corresponding to the portable object associated with the received provision request, among the page turning commands in the control command storage device, to the output device associated with the received provision request.

The output device, upon receiving the transmitted page turning command, turns pages displayed on the display device in response to the received page turning command.

Further, in accordance with the present invention, there is provided an output service provision system wherein the transmitted control command is a forward page turning command prescribing turning pages forward. The output device can be adapted to, upon receiving the forward page turning command, turn the pages displayed on the display means forward in response to the received forward page turning command.

With this structure, if it is determined that the area of the first virtual object is overlapped with the area of the second virtual object as the portable object is brought close to the area of the first virtual object or the vicinity thereof, the portable object management terminal can transmit a forward page turning command corresponding to the portable object associated with the received provision request, among the forward page turning commands in the control command storage device, to the output device associated with the received provision request.

The output device, upon receiving the transmitted forward page turning command, turns the pages displayed on the display means forward in response to the received forward page turning command.

Further, in accordance with the present invention, there is provided an output service provision system wherein the transmitted control command can be a backward page turning command prescribing turning pages backward. The output device can be adapted to, upon receiving the backward page turning command, turn the pages displayed on the display means backward in response to the received backward page turning command.

With this structure, if it is determined that the area of the first virtual object is overlapped the area of the second virtual object as the portable object is brought close to the area of the first virtual object or the vicinity thereof, the portable object management terminal transmits a backward page turning command corresponding to the portable object associated with the received provision request, among the backward page turning commands in the control command storage means, to the output device associated with the received provision request. The output device, upon receiving the transmitted backward page turning command, turns the pages displayed on the display device backward in response to the received backward page turning command.

Further, in accordance with the present invention, there can be provided an output service provision system wherein the system is further communicatably connected with a portable terminal. The virtual object management terminal can include a third storage device for storing third object information regarding a shape and disposed position of a third virtual object in a manner corresponding to the portable terminal, and is adapted to transmit the provision request to provide the output service associated with the output of the output device corresponding to the first virtual object, upon determining, on the basis of the first object information in the first storage means and the third object information in the third storage device, that the area specified by the shape and disposed position of the first virtual object is overlapped with an area specified by the shape and disposed position of the third virtual object. The portable terminal includes display data storage device for storing the display data, and is adapted to, upon receiving the provision request, transmit the display data in the display data storage device to the output device associated with the received provision request.

With this structure, the virtual object management terminal determines, on the basis of the first object information in the first storage means and the third object information in the third storage device, that the area specified by the shape and disposed position of the first virtual object is overlapped with the area specified by the shape and disposed position of the third virtual object. Namely, if the portable terminal is brought close to the area of the first virtual object or the vicinity thereof, the two areas are determined to have overlapped. If it is determined that the two areas have overlapped, the virtual object management terminal transmits the provision request to provide the output service associated with the output of the output device corresponding to the first virtual object.

The portable terminal, upon receiving the provision request, transmits the display data in the display data storage device to the output device associated with the received provision request. The output device, upon receiving display data, conducts a page-unit display on the display means on the basis of the received display data.

The display data storage device may store the display data through any means and at any time, or pre-store it. Alternatively, the display data storage device may store the display data in response to an external input, and the like during the operation of the present system, without pre-storing the display data. This is similarly applied to the storage of the third object information in the third storage device. Also, this can be similarly applied to an output service provision system.

Further, in accordance with the present invention, there is provided an output service provision system, wherein the virtual object management terminal further includes third storage device for storing third object information regarding a shape and disposed position of a third virtual object in a manner corresponding to a second portable object, and is adapted to transmit a provision request to provide the output service associated with the output of the output device corresponding to the first virtual object, upon determining, on the basis of the first object information in the first storage device and the third object information in the third storage device, that the area specified by the shape and disposed position of the first virtual object is overlapped with an area specified by the shape and disposed position of the third virtual object. The portable object management terminal can further include a display data storage device for storing the display data in a manner corresponding to the second portable object, and is adapted to, upon receiving the provision request, transmit display data corresponding to the second portable object associated with the received provision request, among the display data in the display data storage means, to the output device associated with the received provision request.

With this structure, the virtual object management terminal can determine, on the basis of the first object information in the first storage device and the third object information in the third storage device, that the area specified by the shape and disposed position of the first virtual object is overlapped with the area specified by the shape and disposed position of the third virtual object. Namely, if the second portable object is brought close to the area of the first virtual object or the vicinity thereof, the two areas are determined to have overlapped. If it is determined that the two areas have overlapped, the virtual object management terminal transmits the request to provide the output service associated with the output of the output device corresponding to the first virtual object.

The portable object management terminal, upon receiving the provision request, transmits display data corresponding to the second portable object associated with the received provision request, among the display data in the display data storage device, to the output device associated with the received provision request.

The output device, upon receiving display data, conducts a page-unit display on the display device on the basis of the received display data.

Further, in accordance with the present invention, there is provided an output service provision system, wherein the portable object management terminal is connected with a communication service provision terminal in a communicatable manner, the communication service provision terminal providing a service for communication with the portable object management terminal. The communication service provision terminal can include a constituent information storage device for storing communication establishment means constituent information. The constituent information constituting a communication establishment device for establishing communication with the portable object management terminal. The virtual object management terminal can be adapted to transmit the provision request to the output device corresponding to the first virtual object upon determining that the area specified by the shape and disposed position of the first virtual object is overlapped with the area specified by the shape and disposed position of the second virtual object. The output device is adapted to, upon receiving the provision request, acquire the communication establishment means constituent information from the communication service provision terminal, constitute the communication establishment means on the basis of the acquired communication establishment means constituent information and transmit the received provision request to the portable object management terminal associated with the provision request on the basis of the constituted communication establishment device. The portable object management terminal can be adapted to, upon receiving the provision request, transmit a control command corresponding to the portable object associated with the received provision request, among the control commands in the control command storage means, to the output device associated with the received provision request.

With this structure, the virtual object management terminal can transmit the provision request to the output device corresponding to the first virtual object upon determining that the area of the first virtual object is overlapped with the area of the second virtual object.

The output device, upon receiving the provision request, acquires the communication establishment means constituent information from the communication service provision terminal and constitutes the communication establishment means on the basis of the acquired communication establishment means constituent information. The output device then transmits the provision request to the portable object management terminal associated with the received provision request on the basis of the constituted communication establishment means.

The portable object management terminal, upon receiving the provision request, transmits a control command corresponding to the portable object associated with the received provision request, among the control commands in the control command storage means, to the output device associated with the received provision request.

The constituent information storage device may store the communication establishment means constituent information through any means and at any time, or pre-store it. Alternatively, the constituent information storage device can store the communication establishment means constituent information in response to an external input, and the like during the operation of the present system, without pre-storing the communication establishment means constituent information.

The communication service provision terminal may be communication equipment which is connected to one end of a communication path with the output device, and basically has a server function. Alternatively, the communication service provision terminal may be configured to have both a client function and server function.

Further, in accordance with the present invention, there is provided an output service provision system for interconnecting a virtual object management terminal managing virtual objects, an output device, and a portable terminal in a communicatable manner, allowing a first virtual object corresponding to the output device and allowing a second virtual object corresponding to the portable terminal, respectively, arranging the first virtual object in a virtual space corresponding to a real space and arranging the second virtual object at a position of the portable terminal in the virtual space or the vicinity thereof, respectively, and providing an output service associated with an output of the output device corresponding to the first virtual object on the basis of a positional relation between the first virtual object and the second virtual object. The output service provision system can include a positional information acquisition device that acquires positional information specifying the position of the portable terminal. The virtual object management terminal can include a first storage device that stores first object information regarding a shape and disposed position of the first virtual object in a manner corresponding to the output device, and second storage device for storing second object information regarding a shape and disposed position of the second virtual object in a manner corresponding to the portable terminal. The virtual object management terminal can be adapted to update the second object information in the second storage device on the basis of the positional information acquired by the positional information acquisition device, and transmit a provision request to provide the output service associated with the output of the output device corresponding to the first virtual object, upon determining, on the basis of the first object information in the first storage device and the second object information in the second storage device, that an area specified by the shape and disposed position of the first virtual object is overlapped with an area specified by the shape and disposed position of the second virtual object. The portable terminal can include a control command storage device for storing a control command for the operation of the output device, and is adapted to, upon receiving the provision request, transmit the control command in the control command storage device to the output device associated with the received provision request. The output device, upon receiving the transmitted control command, is operated in response to the received control command.

With this structure, the positional information is acquired by the positional information acquisition device, and the virtual object management terminal updates the second object information in the second storage device on the basis of the acquired positional information. A determination is made, on the basis of the first object information in the first storage device and the second object information in the second storage device, as to whether the area specified by the shape and disposed position of the first virtual object is overlapped with the area specified by the shape and disposed position of the second virtual object. That is, if the portable terminal is brought close to the area of the first virtual object or the vicinity thereof, the two areas are determined to have overlapped. If it is determined that the two areas have overlapped, the virtual object management terminal transmits a provision request to provide the output service associated with the output of the output device corresponding to the first virtual object.

The portable terminal, upon receiving the provision request, transmits a control command in the control command storage device to the output device associated with the received provision request.

The output device, upon receiving the transmitted control command, is operated in response to the received control command.

The transmission of the provision request signifies that the virtual object management terminal transmits the provision request directly or indirectly to the portable terminal. For the indirect transmission, for example, under the condition that the virtual object management terminal is communicatably connected with an external terminal, the virtual object management terminal may transmit the provision request to the portable terminal via the external terminal. That is, the virtual object management terminal may transmit the provision request in cooperation with one external terminal or a plurality of external terminals.

The positional information acquisition device may be provided in, for example, a communication terminal to which the portable terminal is communicatably connected, to acquire the positional information by measuring the position of the portable terminal. Alternatively, the portable terminal may measure the position thereof using a GPS, and the like, or the communication terminal may acquire the positional information by calculating it on the basis of measurement information from the portable terminal. And a base station to which the portable terminal is connected may measure the position of the portable terminal, or the communication terminal may acquire the positional information by calculating it on the basis of measurement information from the base station. Alternatively, the positional information acquisition device may be installed in any of the virtual object management terminal, the output device, the portable terminal, and other external terminals communicatably connected to the virtual object management terminal.

Further, in accordance with the present invention, there can be provided an output service provision system, wherein the output device is a projection-type display device. With this structure, the projection-type display device performs a projection display operation in response to a control command.

Further, in accordance with the present invention, there can be provided a portable object management terminal communicatably connected with the virtual object management terminal and the output device in the output service provision system. The portable object management terminal can include a control command storage device for storing control commands for the operation of the output device in a manner corresponding to the portable object, whereby, upon receiving the provision request, transmitting a control command corresponding to the portable object associated with the received provision request, among the control commands in the control command storage means, to the output device associated with the received provision request.

With this structure, the same effect as that of the portable object management terminal in the output service provision system can be obtained.

Further, in accordance with the present invention, there is provided a portable terminal commnunicatably connected with the virtual object management terminal and the output device in the output service provision system. The portable terminal can include a: control command storage device for storing a control command for the operation of the output device, whereby, upon receiving the provision request, transmitting the control command in the control command storage device to the output device associated with the received provision request.

With this structure, the same effect as that of the portable terminal in the output service provision system can be obtained.

Further, in accordance with the present invention, there is provided a portable object management terminal program. The portable object management terminal program can include a process of, upon receiving the provision request, transmitting a control command corresponding to the portable object associated with the received provision request, among the control commands in the control command storage means, to the output device associated with the received provision request. With this structure, the portable object management terminal reads the program and executes the process according to the read program. Therefore, the same effect as that of the portable object management terminal can be obtained.

Further, in accordance with the present invention, there is provided a portable terminal program. The portable terminal program can include a process of, upon receiving the provision request, transmitting the control command in the control command storage means to the output device associated with the received provision request. With this structure, the portable terminal can read the program and execute the process according to the read program. Therefore, the same effect as that of the portable terminal described in claim 12 can be obtained.

BRIEF DESCRIPTION OF THE DRAWINGS

The invention will be described with reference to the accompanying drawings, wherein like numerals reference like elements, and wherein:

FIG. 1 is a view showing the structure of a network system to which the present invention is applied;

FIG. 2 is an exemplary block diagram showing the structure of a virtual object management device 100;

FIG. 3 is a view showing a data structure of a virtual object management table 400;

FIG. 4 is a view showing a data structure of a communication information registration table 500;

FIG. 5 is a flow chart illustrating an exemplary object information update process;

FIG. 6 is a flow chart illustrating an exemplary area-in notification process;

FIG. 7 is a flow chart illustrating an exemplary area-out notification process;

FIG. 8 is an exemplary block diagram showing the structure of a projector 200;

FIG. 9 is a flow chart illustrating an exemplary area-in notification response process;

FIG. 10 is a flow chart illustrating an exemplary area-out notification response process;

FIG. 11 is a flow chart illustrating an exemplary projector control process;

FIG. 12 is an exemplary block diagram showing the structure of a portable terminal 140;

FIG. 13 is a flow chart illustrating a positional information notification process;

FIG. 14 is a flow chart illustrating an exemplary service linkage process;

FIG. 15 is a flow chart illustrating an exemplary projector display data transmission process;

FIG. 16 is a flow chart illustrating an exemplary projector setting data transmission process;

FIG. 17 is a view for explaining an operation of the projector 200 by the cards 160a and 160b;

FIG. 18 is a view illustrating the other embodiment in which the printer 220 is operated by the cards 160c to 160e;

FIG. 19 is a flow chart illustrating an exemplary projector control process;

FIG. 20 is a view illustrating the other embodiment in which the printer 220 is operated by the card 160e;

FIG. 21 is a flow chart illustrating a projector control process;

FIG. 22 is a view for explaining the case in which a printing command is assigned to the card 160;

FIG. 23 is a flow chart illustrating an exemplary projector control process;

FIG. 24 is a view for explaining the case in which the operation content of the projector 200 is varied in accordance with the direction of the card 160;

FIG. 25 is a flow chart illustrating an exemplary projector control process; and FIG. 26 is a view for explaining the case in which the operation content of the projector 200 is varied in accordance with the direction of the card 160.

DETAILED DESCRIPTION OF PREFERRED EMBODIMENTS

Now, a preferred embodiment of the present invention will be described with reference to the accompanying drawings. FIGS. 1 to 17 are views showing an operation control system, an output service provision system, a portable object management terminal, a portable terminal, a portable object management terminal program, and a portable terminal program in accordance with the preferred embodiment of the present invention.

In the operation control system, output service provision system, portable object management terminal, portable terminal, portable object management terminal program, and portable terminal program in accordance with the preferred embodiment of the present invention, as shown in FIG. 1, in a presentation meeting place, a sphere-shaped virtual object A is disposed and set in an area surrounding a projector 200, a virtual object B and virtual object C are disposed and set respectively in areas surrounding a portable terminal 140 and card 160a used by a presenter, and a projection service by the projector 200 is initiated on the basis of projector display data when the virtual objects A and B overlap with each other, or when the virtual objects A and C overlap with each other.

First, the structure of a network system to which the present invention is applied will be described with reference to FIG. 1. FIG. 1 is a view showing the structure of the network system to which the present invention can be applied. In FIG. 1, installed on a wall of the presentation meeting place are a virtual object management device 100 for managing the virtual objects, a card management device 180 for managing cards 160a and 160b, and a service linkage management device 240 for managing an inter-device service linkage.

Further installed in the presentation meeting place are the projector 200 used for presentations, and a printer 220 for printing presentation data. Also provided in the presentation meeting place are the portable terminal 140, such as a personal digital assistant (PDA), used by the presenter and the cards 160a and 160b used by the presenter. Stored in the portable terminal 140 is projector display data to be projected by the projector 200 as the presentation data. As will be described in great detail below, the card 160a is assigned a forward page turning command (for example, "NEXT") as an operation command for the projector 200, and the card 160b is assigned a backward page turning command (for example, "PRIOR") as an operation command for the projector 200. The presenter conducts a presentation by operating the projector 200 while selectively using the cards 160a and 160b.

The virtual object management device 100, portable terminal 140, cards 160a and 160b, card management device 180, projector 200, printer 220, and service linkage management device 240 are configured to be communicatable with one another in a wireless communication manner. In detail, the virtual object management device 100 communicates with the portable terminal 140, cards 160a and 160b, card management device 180, projector 200, printer 220, and service linkage management device 240, and the portable terminal 140 communicates with the virtual object management device 100, projector 200, printer 220, and service linkage management device 240. The cards 160a and 160b communicate with the virtual object management device 100, and the card management device 180 communicates with the virtual object management device 100, projector 200, printer 220, and service linkage management device 240. The projector 200 and printer 220 communicate with the virtual object management device 100, portable terminal 140, card management device 180, and service linkage management device 240.

On the other hand, the sphere-shaped virtual object A is set in the area surrounding the projector 200, and the sphere-shaped virtual object B is set in the area surrounding the portable terminal 140. Also, the sphere-shaped virtual object C is set in the area surrounding the card 160a, a sphere-shaped virtual object C' is set in an area surrounding the card 160b, and a sphere-shaped virtual object D is set in an area surrounding the printer 220. These virtual objects are logical areas managed by the virtual object management device 100.

The service linkage management device 240 can include a storage unit for storing communication object data for establishment of communications with the portable terminal 140, card management device 180, projector 200, and printer 220. The service linkage management device 240 is adapted to read and transmit the communication object data from the storage unit in response to requests from the respective devices. Stored in the storage unit are communication object data A for establishment of communication with the projector 200, communication object data B for establishment of communication with the portable terminal 140, communication object data C for establishment of communication with the printer 220, and communication object data D for establishment of communication with the card management device 180. For example, the portable terminal 140 establishes communication with the projector 200 by acquiring the communication object data A from the service linkage management device 240 and executing a communication establishment process on the basis of the acquired communication object data A. In other words, each of the communication object data A~D functions as a driver for establishment of communication with a specific counterpart.

Next, a detailed description will be given of the structure of the virtual object management device 100 with reference to FIG. 2. FIG. 2 is an exemplary block diagram showing the structure of the virtual object management device 100.

The virtual object management device 100 can include, as shown in FIG. 2, a CPU 30 for, on the basis of a control program, performing a computing operation and controlling the entire system, a ROM 32 for pre-storing the control program of the CPU 30, etc. in a predetermined area thereof, a RAM 34 for storing data read from the ROM 32, and the like or operation results necessary to the computing operation of the CPU 30, and an I/F 38 for interfacing input/output data with external devices. These components can be interconnected via a bus 39, which is a signal line for transfer of data, such that they exchange data with one another over the bus 39.

Connected to the I/F 38 are, as the external devices, a wireless communication device 40 for communicating with the portable terminal 140, cards 160a and 160b, card management device 180, projector 200, printer 220, and service linkage management device 240 in a wireless communication manner, a virtual object management database (referred to hereinafter as a DB) 42 for registering and managing object information regarding the virtual objects, and a display device 44 for displaying an image on the basis of an image signal.

The virtual object management DB 42 stores a virtual object management table 400 capable of registering object information regarding the shapes and disposed positions of the virtual objects in a manner corresponding to service information prescribing service contents, as shown in FIG. 3. FIG. 3 is a view showing a data structure of the virtual object management table 400.

The virtual object management table 400 is configured to be capable of registering one record for each of the virtual objects, as shown in FIG. 3. Each record includes a field 402 for registering a serial number, a field 404 for registering a type of a service based on a device, such as the projector 200 or the like, a field 406 for registering a service ID specifying the service, a field 408 for registering coordinates indicative of the disposed position of the corresponding virtual object in the virtual space corresponding to the real space, a field 410 for registering the shape of the corresponding virtual object, a field 412 for registering the size of the corresponding virtual object, and a field 414 for registering area-in management information for management of an inter-service linkage. Here, data of the fields 404 and 406 correspond to service information, and data of the fields 408 to 412 correspond to object information.

In the first-stage record in the example of FIG. 3, "1" is registered as the serial number in the field 402, "projector service" as the service type in the field 404, "0001" as the service ID in the field 406, "(10,50,20)" as the coordinates in the field 408, "sphere" as the shape in the field 410, and "2[m]" as the size in the field 412, respectively. This first-stage record signifies that the virtual object A is virtually disposed as a spherical shape, having a radius of 2[m] about coordinates (10,50,20), as the center of the sphere, in the real space where the projector 200 is installed, and the projection service by the projector 200 is carried out in the internal area of the virtual object A specified by the disposed position and shape.

In the second-stage record in FIG. 3, "2" is registered as the serial number in the field 402, "PDA service" as the service type in the field 404, "0002" as the service ID in the field 406, "(30,40,20)" as the coordinates in the field 408, "sphere" as the shape in the field 410, and "1[m]" as the size in the field 412, respectively. This second-stage record signifies that the virtual object B is virtually disposed as a spherical shape having a radius of 1[m] about coordinates (30,40,20), as the center of the sphere, in the real space where the portable terminal 140 is present, and a service by the portable terminal 140 is carried out in the internal area of the virtual object B specified by the disposed position and shape. Note that the coordinates in the real space where the portable terminal 140 exists are changeable momentarily. In this regard, for the PDA service, positional information is acquired from the portable terminal 140, and the coordinates in the field 408 are updated on the basis of the acquired positional information. For example, in the case where the area of the virtual object A and the area of the virtual object B overlap with each other, the projector service and the PDA service are linked to each other, and the projector 200 and the portable terminal 140 are interoperable with each other.

The virtual object management DB 42 can further store a communication information registration table 500 for registering communication information specifying communication object data to be acquired from the service linkage management device 240 for service use with respect to each service to be used, as shown in FIG. 4. FIG. 4 is a view showing an exemplary data structure of the communication information registration table 500.

The communication information registration table 500 is configured to register one record for each service, as shown in FIG. 4. Each record can include a field 502 for registering a service ID, a field 504 for registering a service type, and a field 506 for registering communication information. Notably, the communication information registration table 500 is stored in storage units of not only the virtual object management device 100, but also the portable terminal 140, card management device 180, projector 200, printer 220, and service linkage management device 240.

In the first-stage record in the example of FIG. 4, "0001" is registered as the service ID in the field 502, "projector service" as the service type in the field 504, and "communication object data A" as the communication information in the field 506, respectively. This first-stage record signifies that communication object data to be acquired from the service linkage management device 240 for use of the project service is the communication object data A.

The CPU 30 may preferably be a micro processing unit (MPU), which runs a predetermined program stored in a predetermined area of the ROM 32 to execute an object information update process, area-in notification process, and area-out notification process shown respectively in flow charts of FIGS. 5 to 7 in a time division manner.

First, the object information update process will be described in detail with reference to FIG. 5. FIG. 5 is a flow chart illustrating an exemplary object information update process. The object information update process is executed by the CPU 30 to update the disposed position of the virtual object B on the basis of positional information from the portable terminal 140. In this object information update process, it first proceeds to step S404, as shown in FIG. 5.

At step S404, it is determined whether positional information has been received. Upon determining at step S404 that the positional information has been received (Yes), the process proceeds to step S406. In the case where no positional information is determined to have been received at step S404 (No), the process waits at step S404 until positional information is received.

At step S406, the process updates the coordinates in the field 408 of the virtual object management table 400 for the PDA service on the basis of the received positional information, and then proceeds to step S408 to notify the portable terminal 140 of a positional information reception response, end a sequence of processes, and then return to the original process.

The object information update process shown in the flow chart of FIG. 5 is performed to update the disposed position of the virtual object B corresponding to the portable terminal 140. This object information update process is similarly applied to the virtual objects C and C' corresponding to the cards 160a and 160b. In this case, steps S404 to S408 are performed with respect to the cards 160a and 160b instead of the portable terminal 140.

Next, the area-in notification process will be described in detail with reference to FIG. 6. FIG. 6 is a flow chart illustrating the area-in notification process.

The area-in notification process is executed by the CPU 30 to notify each device of the overlap of the area of one of two virtual objects with the area of the other. In this area-in notification process, it first proceeds to step S500, as shown in FIG. 6.

At step S500, it reads a record (referred to hereinafter as object information and service information of the portable terminal 140 in this process) regarding the PDA service from the virtual object management table 400 and then proceeds to step S502. At step S502, the process reads an initial record (referred to hereinafter as object information and service information of a target device in this process) from the virtual object management table 400 and then proceeds to step S504.

At step S504, it is determined, on the basis of the object information of the portable terminal 140 and the object information of the target device, whether an area specified by the shape and disposed position of the virtual object B has overlapped with an area specified by the shape and disposed position of a virtual object corresponding to the target device. Upon determining at step S504 that the two areas have overlapped with each other (referred to hereinafter as an area-in state) (Yes), the process proceeds to step S554.

At step S554, the process creates an electronic mail (E-mail) with a message indicating that operation authorization of the target device is settable, and then proceeds to step S556 to attach an E-mail address of the virtual object management device 100 to the created E-mail. At step S558, the process reads communication information of the PDA service from the communication information registration table 500, and acquires communication object data B from the service linkage management device 240 on the basis of the read communication information, and then proceeds to step S560. At step S560, the process establishes communication with the portable terminal 140 by executing a communication establishment process on the basis of the acquired communication object data B, and transmits the E-mail created at steps S554 and S556 to the portable terminal 140 in an E-mail communication manner, and then proceeds to step S562.

At step S562, it is determined whether a response mail to the E-mail transmitted at step S560 has been received. Upon determining at step S562 that the response mail has been received (Yes), the process sets the operation authorization of the target device at step S564 and then proceeds to step S506. In the case where it is determined at step S562 that no response mail to the transmitted E-mail has been received (No), the process waits at step S560 until a response mail to the transmitted E-mail is received.

At step S506, the process reads communication information from the communication information registration table 500 on the basis of the service information of the target device, and acquires communication object data of a corresponding service from the service linkage management device 240 on the basis of the read communication information, and then proceeds to step S508. At step S508, the process establishes communication with the target device by executing a communication establishment process on the basis of the acquired communication object data, and notifies the target device of the area-in state and then proceeds to step S540.

At step S540, the process determines whether a response to the area-in notification has been received. Upon determining at step S540 that the area-in notification response has been received (Yes), the process proceeds to step S542. If it is determined at step S540 that no response to the area-in notification has been received (No), the process waits at step S540 until a response to the area-in notification is received.

At step S542, the process registers a service ID of the corresponding service in area-in management information of the PDA service, and then proceeds to step S544 to determine whether the process of steps S504 to S542 has been ended with respect to all services registered in the virtual object management table 400. If the process of steps S504 to S542 is determined to have been ended at step S544 (Yes), the process ends a sequence of processes and then returns to the original process.

On the other hand, upon determining at step S544 that the process of steps S504 to S542 has not been ended with respect to all the services (No), the process proceeds to step S546 to read a next record from the virtual object management table 400 and then return to step S504.

Meanwhile, in the case where it is determined at step S504 that the two areas are not in the area-in state (No), the process proceeds to step S544.

The area-in notification process shown in the flow chart of FIG. 6 is performed to notify the area-in state of the PDA service. This area-in notification process is similarly applied to a card service. In this case, steps S500 and S542 are performed with respect to the card service instead of the PDA service, and steps S554 to S564 are omitted.

Next, the area-out notification process will be described in detail with reference to FIG. 7. FIG. 7 is an exemplary flow chart illustrating the area-out notification process.

The area-out notification process can be executed by the CPU 30 to notify each device that the overlap of the area of one of two virtual objects with the area of the other has been released. In this area-out notification process, the process first proceeds to step S600, as shown in FIG. 7.

At step S600, the process reads a record (referred to hereinafter as object information and service information of the portable terminal 140 in this process) regarding the PDA service from the virtual object management table 400, and then proceeds to step S602. At step S602, the process reads an initial service ID from the area-in management information of the PDA service, and then proceeds to step S604. At step S604, the process reads a record (referred to hereinafter as object information and service information of a target device in this process) regarding a service corresponding to the read service ID from the virtual object management table 400, and then proceeds to step S606.

At step S606, it is determined, on the basis of the object information of the portable terminal 140 and the object information of the target device, whether an area specified by the shape and disposed position of the virtual object B has not overlapped with an area specified by the shape and disposed position of a virtual object corresponding to the target device. Upon determining at step S606 that the two areas have not overlapped with each other (referred to hereinafter as an area-out state) (Yes), the process proceeds to step S608.

At step S608, the process reads communication information from the communication information registration table 500 on the basis of the service information of the target device, and acquires communication object data of the corresponding service from the service linkage management device 240 on the basis of the read communication information, and then proceeds to step S610. At step S610, the process establishes communication with the target device by executing a communication establishment process on the basis of the acquired communication object data, and notifies the target device of the area-out state, and then proceeds to step S626.

At step S626, it is determined whether a response to the area-out notification has been received. Upon determining at step S626 that the area-out notification response has been received (Yes), the process proceeds to step S628. If it is determined at step S626 that no response to the area-out notification has been received (No), the process waits at step S626 until a response to the area-out notification is received.

At step S628, the process deletes the service ID of the corresponding service from the area-in management information of the PDA service, and then proceeds to step S630 to determine whether the process of steps S604 to S628 has been ended with respect to all services registered in the area-in management information of the PDA service. If the process of steps S604 to S628 is determined to have been ended at step S630 (Yes), the process ends a sequence of processes, and then returns to the original process.

On the other hand, upon determining at step S630 that the process of steps S604 to S628 has not been ended with respect to all the services (No), the process proceeds to step S632 to read a next service ID from the area-in management information of the PDA service, and then return to step S604.

Meanwhile, in the case where it is determined at step S606 that the two areas are not in the area-out state (No), the process proceeds to step S630.

The area-out notification process shown in the flow chart of FIG. 7 is performed to notify the area-out state of the PDA service. This area-out notification process is similarly applied to the card service. In this case, steps S600 and S628 are performed with respect to the card service instead of the PDA service.

Next, a detailed description will be given of the structure of the projector 200 with reference to FIG. 8. FIG. 8 is an exemplary block diagram showing the structure of the projector 200.

The projector 200 can include, as shown in FIG. 8, a CPU 70 for, on the basis of a control program, performing a computing operation and controlling the entire system, a ROM 72 for pre-storing the control program of the CPU 70, and the like in a predetermined area thereof, a RAM 74 for storing data read from the ROM 72, etc. or operation results necessary to the computing operation of the CPU 70, and an I/F 78 for interfacing input/output data with external devices. These components can be interconnected via a bus 79, which is a signal line for transfer of data, such that they exchange data with one another over the bus 79.

Connected to the I/F 78 are, as the external devices, a wireless communication device 80 for communicating with the virtual object management device 100, portable terminal 140, card management device 180, and service linkage management device 240 in a wireless communication manner, and a projection device 82 for projecting an image onto a screen on the basis of an image signal.

The CPU 70 may preferably be a micro processing unit (MPU), which runs a predetermined program stored in a predetermined area of the ROM 72 to execute an area-in notification response process and area-out notification response process shown respectively in flow charts of FIGS. 9 and 10 in a time division manner.

First, the area-in notification response process will be described in detail with reference to FIG. 9. FIG. 9 is a flow chart illustrating the area-in notification response process.

The area-in notification response process corresponds to the area-in notification process of FIG. 6. In this area-in notification response process, upon executing by the CPU 70, the process first proceeds to step S510, as shown in FIG. 9.

At step S510, it is determined whether an area-in notification has been received. Upon determining at step S510 that the area-in notification has been received (Yes), the process proceeds to step S512. If it is determined at step S510 that no area-in notification has been received (No), the process waits at step S510 until an area-in notification is received.

At step S512, it is determined whether a service associated with the received area-in notification is the PDA service. If it is determined at step S512 that the service associated with the received area-in notification is the PDA service (Yes), the process proceeds to step S514 to read communication information of the PDA service from the communication information registration table 500, and acquire communication object data B from the service linkage management device 240 on the basis of the read communication information. At step S516, the process establishes communication with the portable terminal 140 by executing a communication establishment process on the basis of the acquired communication object data B, and transmits a service linkage initiation request to the portable terminal 140, and then proceeds to step S524. At step S524, the process transmits a projector display data transmission request to the portable terminal 140, and then proceeds to step S534. Here, the linkage initiation request at step S516 and the transmission request at step S524 may be transmitted in the E-mail communication manner.

At step S534, it is determined whether projector display data has been received. Upon determining at step S534 that the projector display data has been received (Yes), the process proceeds to step S536. In the case where no projector display data is determined to have been received at step S534 (No), the process waits at step S534 until projector display data is received.

At step S536, the process executes a projection process by the projection device 82 on the basis of the received projector display data, and then proceeds to step S538. At step S538, the process notifies the virtual object management device 100 of a response to the area-in notification reception, and ends a sequence of processes, and then returns to the original process.

On the other hand, in the case where it is determined at step S512 that the service associated with the received area-in notification is not the PDA service (No), the process proceeds to step S547 to determine whether the service associated with the received area-in notification is the card service. Upon determining at step S547 that the service associated with the received area-in notification is the card service (Yes), the process proceeds to step S548 to read communication information of the card service from the communication information registration table 500, and acquire communication object data D from the service linkage management device 240 on the basis of the read communication information. At step S550, the process establishes communication with the card management device 180 by executing a communication establishment process on the basis of the acquired communication object data D, and transmits a service linkage initiation request to the card management device 180, and then proceeds to step S576. At step S576, the process executes a process of controlling the projector 200 in response to operation commands, and then proceeds to step S538.

On the other hand, if it is determined at step S547 that the service associated with the received area-in notification is not the card service (No), the process proceeds to step S578 to read communication information of the corresponding service from the communication information registration table 500, and acquire communication object data of the corresponding service from the service linkage management device 240 on the basis of the read communication information. At step S580, the process establishes communication with a target device of the corresponding service by executing a communication establishment process on the basis of the acquired communication object data, and transmits a service linkage initiation request to the target device of the corresponding service, and then proceeds to step S582. At step S582, the process executes a service linkage process and then proceeds to step S538.

Next, the area-out notification response process will be described in detail with reference to FIG. 10. FIG. 10 is a flow chart illustrating an exemplary area-out notification response process.

The area-out notification response process corresponds to the area-out notification process of FIG. 7. In this area-out notification response process, upon executing by the CPU 70, the process first proceeds to step S612, as shown in FIG. 10.

At step S612, the process is determined whether an area-out notification has been received. Upon determining at step S612 that the area-out notification has been received (Yes), the process proceeds to step S614. If it is determined at step S612 that no area-out notification has been received (No), the process waits at step S612 until an area-out notification is received.

At step S614, it is determined whether a service associated with the received area-out notification is the PDA service. If it is determined at step S614 that the service associated with the received area-out notification is the PDA service (Yes), the process proceeds to step S616 to read communication information of the PDA service from the communication information registration table 500, and acquire communication object data B from the service linkage management device 240 on the basis of the read communication information. At step S618, the process establishes communication with the portable terminal 140 by executing a communication establishment process on the basis of the acquired communication object data B, and transmits a service linkage termination request to the portable terminal 140, and then proceeds to step S624. At step S624, the process transmits a response to the area-out notification reception to the virtual object management device 100, and ends a sequence of processes, and then returns to the original process.

On the other hand, in the case where it is determined at step S614 that the service associated with the received area-out notification is not the PDA service (No), the process proceeds to step S634 to read communication information of a corresponding service from the communication information registration table 500, and acquire communication object data of the corresponding service from the service linkage management device 240 on the basis of the read communication information. At step S636, it establishes communication with a target device of the corresponding service by executing a communication establishment process on the basis of the acquired communication object data, and transmits a service linkage termination request to the target service of the corresponding service, and then proceeds to step S624.

The area-out notification response process shown in the flow chart of FIG. 10 is performed to respond to the notification of the area-out state of the PDA service. This area-out notification response process is similarly applied to the card service. In this case, steps S614 and S616 are performed with respect to the card service instead of the PDA service.

Next, a detailed description will be given of the projector control process of the above step S576 with reference to FIG. 11. FIG. 11 is a flow chart illustrating an exemplary projector control process.

The projector control process is performed to control the projector 200 in response to the operation commands assigned to the cards 160a and 160b. In this projector control process of step S576, it first proceeds to step S700, as shown in FIG. 11.

At step S700, it is determined whether the projection process of step S536 is in progress. Upon determining at step S700 that the projection process is in progress (Yes), the process proceeds to step S702 to determine whether an operation command has been received. If it is determined at step S702 that the operation command has been received (Yes) the process proceeds to step S704.

At step S704, it is determined whether the received operation command is "NEXT". Upon determining at step S704 that the received operation command is "NEXT" (Yes), the process proceeds to step S706 to turn a presentation in projection forward by one page, and end a sequence of processes, and then return to the original process.

On the other hand, if it is determined at step S704 that the received operation command is not "NEXT" (No), the process proceeds to step S708 to determine whether the received operation command is "PRIOR". Upon determining at step S708 that the received operation command is "PRIOR" (Yes), the process proceeds to step S710 to turn the presentation in projection backward by one page, and end a sequence of processes, and then return to the original process.

On the other hand, in the case where it is determined at step S708 that the received operation command is not "PRIOR" (No), the process ends a sequence of processes, and then returns to the original process.

Meanwhile, upon determining at step S702 that no operation command has been received (No), or upon determining at step S700 that the projection process is not in progress (No), the process proceeds to step S700.

Next, the structure of the printer 220 will be described in detail. The printer 220 is substantially the same in structure as the projector 200, with the exception that a printing device is provided instead of the projection device 82. The printer 220 also has a CPU for executing processes corresponding to the area-in notification response process and area-out notification response process of FIGS. 9 and 10. In this case, a printing process is executed on the basis of received projector display data by the printing device, instead of the projection process of step S536.

Next, the structure of the portable terminal 140 will be described in detail with reference to FIG. 12. FIG. 12 is an exemplary block diagram showing the structure of the portable terminal 140.

The portable terminal 140 includes, as shown in FIG. 12, a CPU 90 for, on the basis of a control program, performing a computing operation and controlling the entire system, a ROM 92 for pre-storing the control program of the CPU 90, etc. in a predetermined area thereof, a RAM 94 for storing data read from the ROM 92, etc. or operation results necessary to the computing operation of the CPU 90, and an I/F 98 for interfacing input/output data with external devices. These components can be interconnected via a bus 99, which is a signal line for transfer of data, such that they exchange data with one another over the bus 99.

Connected to the I/F 98 are, as the external devices, a wireless communication device 83 for communicating with the virtual object management device 100, projector 200, printer 220, and service linkage management device 240 in a wireless communication manner, a key panel 84 as a human interface for enabling the input of data by a plurality of keys, an LCD (Liquid Crystal Display) 85 for displaying an image on the basis of an image signal, and a positional information acquisition device 86 for measuring the current position of the portable terminal 140 to acquire positional information specifying the current position.

The positional information acquisition device 86 is adapted to measure the current position of the portable terminal 140 using a GPS, which receives time signals indicative of the current time transmitted from orbiting satellites, and measures a position on the basis of a time deviation based on the received time signals and orbits of the respective orbiting satellites, and output the measured current position as positional information.

The CPU 90 may preferably be a micro processing unit (MPU), which runs a predetermined program stored in a predetermined area of the ROM 92 to execute a positional information notification process, service linkage process, and projector display data transmission process shown respectively in flow charts of FIGS. 13 to 15 in a time division manner.

First, the positional information notification process will be described in detail with reference to FIG. 13. FIG. 13 is a flow chart illustrating an exemplary positional information notification process.

The positional information notification process corresponds to the object information update process of FIG. 5. In this positional information notification process, upon executing by the CPU 90, the process first proceeds to step S400, as shown in FIG. 13.

At step S400, the process acquires positional information from the positional information acquisition device 86, and then proceeds to step S402. At step S402, the process transmits the acquired positional information to the virtual object management device 100, and then proceeds to step S410.

At step S410, it is determined whether a response to the positional information transmission has been received. If it is determined at step S410 that the response has been received (Yes), the process ends a sequence of processes, and then returns to the original process. In the case where it is determined at step S410 that no response to the positional information transmission has been received (No), the process waits at step S410 until a response to the positional information transmission is received.

Next, the service linkage process will be described in detail with reference to FIG. 14. FIG. 14 is a flow chart illustrating the service linkage process. The service linkage process corresponds to the area-in notification response process and area-out notification response process of FIGS. 9 and 10. In this service linkage process, upon executing by the CPU 90, the process first proceeds to step S518, as shown in FIG. 14.

At step S518, it is determined whether a service linkage initiation request has been received. Upon determining at step S518 that the service linkage initiation request has been received (Yes), the process proceeds to step S520 to read communication information of a corresponding service associated with the received service linkage initiation request from the communication information registration table 500, and acquires communication object data of the corresponding service from the service linkage management device 240 on the basis of the read communication information. At step S522, the process establishes communication with a target device of the corresponding service by executing a communication establishment process on the basis of the acquired communication object data, and initiates linkage with the corresponding service, and ends a sequence of processes, and then returns to the original process.

On the other hand, in the case where it is determined at step S518 that no service linkage initiation request has been received (No), the process proceeds to step S620 to determine whether a service linkage termination request has been received. Upon determining at step S620 that the service linkage termination request has been received (Yes), the process proceeds to step S622 to terminate linkage with a corresponding service associated with the received service linkage termination request, and ends a sequence of processes, and then return to the original process.

On the other hand, in the case where it is determined at step S620 that no service linkage termination request has been received (No), the process returns to step S518.

Next, the projector display data transmission process will be described in detail with reference to FIG. 15. FIG. 15 is a flow chart illustrating the projector display data transmission process.

The projector display data transmission process corresponds to the area-in notification response process of FIG. 9. In this projector display data transmission process, upon executing by the CPU 90, the process first proceeds to step S526, as shown in FIG. 15.

At step S526, it is determined whether service linkage is in progress. Upon determining at step S526 that service linkage is in progress (Yes), the process proceeds to step S528. If it is determined at step S526 that service linkage is not in progress, the process waits at step S526.

At step S528, it is determined whether a projector display data transmission request has been received. If it is determined at step S528 that the transmission request has been received (Yes), the process proceeds to step S530. In the case where it is determined at step S528 that no projector display data transmission request has been received (No), the process waits at step S528 until a projector display data transmission request is received.

At step S530, the process reads projector display data from the RAM 94, etc. and then proceeds to step S532. At step S532, the process transmits the read projector display data to a target device of a corresponding service, and ends a sequence of processes, and then returns to the original process.

Next, a detailed description will be given of the structures of the cards 160a and 160b.

The cards 160a and 160b can each include, although not shown, a wireless communication device for communicating with the virtual object management device 100 in a wireless communication manner, and a positional information acquisition device for measuring the current position of the corresponding card to acquire positional information specifying the current position. The cards 160a and 160b can each be adapted to transmit the positional information acquired from the positional information acquisition device to the virtual object management device 100 at predetermined periods by the wireless communication device. In detail, this process corresponds to the positional information notification process shown in the flow chart of FIG. 13, among the processes executed by the portable terminal 140.

The cards 160a and 160b can also each include, for example, an internal circuit provided with a coil and a capacitor connected to the coil. An electromagnetic radiator (not shown) installed in the meeting place radiates electromagnetic waves, which are received by the coil, and then converted into power by electromagnetic induction. The converted power is stored on the capacitor, and then supplied to the wireless communication device and positional information acquisition device to drive them.

Next, a detailed description will be given of the structure of the card management device 180. The card management device 180 is configured to have the same functions as those of a general computer with a CPU, ROM, RAM, I/F, etc. connected to a bus. The card management device 180 can include a storage unit for storing projector display data prescribing various display associated settings, such as a color tone, chroma/saturation, screen size, focus, and the like.

The CPU of the card management device 180 may preferably be a micro processing unit (MPU), which runs a predetermined program stored in a predetermined area of the ROM to execute processes corresponding respectively to the service linkage process and projector display data transmission process and projector display data transmission process shown respectively in the flow charts of FIGS. 14 and 15, among the processes executed by the portable terminal 140, and a projector setting data transmission process shown in a flow chart of FIG. 16 in a time division manner. FIG. 16 is a flow chart illustrating an exemplary projector setting data transmission process.

The projector setting data transmission process corresponds to the area-in notification response process of FIG. 9. In this projector setting data transmission process, upon executing by the CPU of the card management device 180, the process first proceeds to step S566, as shown in FIG. 16.

At step S566, it is determined whether service linkage is in progress. Upon determining at step S566 that service linkage is in progress (Yes), the process proceeds to step S568. If it is determined at step S566 that service linkage is not in progress (No), the process waits at step S566.

At step S568, it is determined whether a linked card service is associated with the card 160a. If it is determined at step S568 that the linked card service is associated with the card 160a (Yes), the process proceeds to step S570 to transmit the operation command "NEXT" to the target device of the corresponding service, and end a sequence of processes, and then return to the original process.

On the other hand, in the case where it is determined at step S568 that the linked card service is not associated with the card 160a (No), the process proceeds to step S572 to determine whether the linked card service is associated with the card 160b. If it is determined at step S572 that the linked card service is associated with the card 160b (Yes), the process proceeds to step S574 to transmit the operation command "PRIOR" to the target device of the corresponding service, and end a sequence of processes, and then return to the original process.

On the other hand, in the case where it is determined at step S572 that the linked card service is not associated with the card 160b (No), the process ends a sequence of processes, and then returns to the original process.

Next, the operation of the preferred embodiment of the present invention will be described.

In order to conduct a presentation, the presenter first stores projector display data for the presentation in the portable terminal 140, and then moves within the meeting place while carrying the portable terminal 140, and the cards 160a and 160b. At this time, the portable terminal 140 performs steps S400 and S402. At steps S400 and S402, the portable terminal 140 acquires positional information from the positional information acquisition device 86, and transmits the acquired positional information to the virtual object management device 100. Also, the cards 160a and 160b perform processes corresponding to steps S400 and S402. At steps S400 and S402, the cards 160a and 160b acquire positional information from the positional information acquisition device, and transmit the acquired positional information to the virtual object management device 100.

Upon receiving the positional information from the portable terminal 140, the virtual object management device 100 updates the coordinates in the field 408 of the virtual object management table 400 for the PDA service on the basis of the received positional information at step S406, and notifies the portable terminal 140 of a response to the positional information reception at step S408. Also, upon receiving the positional information from the cards 160a and 160b, the virtual object management device 100 performs processes corresponding to steps S406 and S408 to update the coordinates in the field 408 of the virtual object management table 400 for the card service on the basis of the received positional information, and notify the cards 160a and 160b of responses to the positional information reception.

Upon receiving the response to the positional information transmission, the portable terminal 140 transmits the positional information repeatedly at intervals of a predetermined period of time (for example, about 3 seconds). Also, upon receiving the responses to the positional information transmission, the cards 160a and 160b each transmit the positional information repeatedly at intervals of a predetermined period of time (for example, about 3 seconds). As a result, the disposed positions of the virtual objects B, C, and C' are updated with the movements of the portable terminal 140, and cards 160a and 160b.

Next, in order to initiate the presentation, the presenter brings the portable terminal 140 close to the projector 200. If the virtual object B enters the area-in state with respect to the virtual object A, the virtual object management device 100 performs steps S500 to S504, S554, and S556. At steps S500 to S504, S554, and S556, the virtual object management device 100 creates an E-mail with a message indicating that operation authorization of the projector 200 is settable, and then attaches an E-mail address of the virtual object management device 100 to the created E-mail. Thereafter, at step S558, the virtual object management device 100 reads communication information of the PDA service from the communication information registration table 500, and acquires communication object data B from the service linkage management device 240 on the basis of the read communication information. Subsequently, at step S560, the virtual object management device 100 establishes communication with the portable terminal 140 by executing a communication establishment process on the basis of the acquired communication object data B, and transmits the E-mail created at steps S554 and S556 to the portable terminal 140 in the E-mail communication manner.

If the presenter receives through the portable terminal 140 the E-mail with the message indicating that operation authorization of the projector 200 is settable, the presenter clicks an E-mail address of a response destination attached to the received E-mail, and then transmits a response mail to the received E-mail to the virtual object management device 100 in the E-mail communication manner.

Upon receiving the response mail, the virtual object management device 100 sets operation authorization of the projector 200 through steps S562 and S564. Thereafter, at step S506, the virtual object management device 100 reads communication information from the communication information registration table 500 on the basis of service information of the projector 200, and acquires communication object data A from the service linkage management device 240 on the basis of the read communication information. Then, at step S508, the virtual object management device 100 establishes communication with the projector 200 by executing a communication establishment process on the basis of the acquired communication object data A, and notifies the projector 200 of the area-in state.

Upon receiving the area-in notification, the projector 200 recognizes that a service associated with the received area-in notification is the PDA service, and then performs steps S512 and S514. At steps S512 and S514, the projector 200 reads communication information of the PDA service from the communication information registration table 500, and acquires communication object data B from the service linkage management device 240 on the basis of the read communication information. Then, at steps S516 and S524, the projector 200 establishes communication with the portable terminal 140 by executing a communication establishment process on the basis of the acquired communication object data B, and transmits a service linkage initiation request and projector display data transmission request to the portable terminal 140 in the E-mail communication manner.

The portable terminal 140 receives the service linkage initiation request and recognizes that a service associated with the received service linkage initiation request is the projector service. As a result, at step S520, the portable terminal 140 reads communication information of the projector service from the communication information registration table 500, and acquires communication object data A from the service linkage management device 240 on the basis of the read communication information. Then, at step S522, the portable terminal 140 establishes communication with the projector 200 by executing a communication establishment process on the basis of the acquired communication object data A, and initiates linkage with the projector service. Upon receiving the projector display data transmission request while the linkage with the projector service is in progress, the portable terminal 140 reads projector display data at step S530, and transmits the read projector display data to the projector 200 at step S532.

Upon receiving the projector display data, the projector 200 executes a projection process by the projection device 82 on the basis of the received projector display data at step S536, and notifies the virtual object management device 100 of a response to the area-in notification reception at step S538.

The virtual object management device 100 receives the response to the area-in notification and registers a service ID of the projector service in the area-in management information of the PDA service at step S542. The virtual object management device 100 then manages the linkage between the PDA service and the projector service.

Thereafter, in order to turn the presentation in projection forward by one page, the presenter brings the card 160a assigned the operation command "NEXT" close to the projector 200. As a result, if the virtual object C enters the area-in state with respect to the virtual object A, the virtual object management device 100 performs processes corresponding to steps S500 to S506 to read communication information from the communication information registration table 500 on the basis of service information of the projector 200, and acquires communication object data A from the service linkage management device 240 on the basis of the read communication information. Then, the virtual object management device 100 performs a process corresponding to step S508 to establish communication with the projector 200 by executing a communication establishment process on the basis of the acquired communication object data A, and notify the projector 200 of the area-in state.

Upon receiving the area-in notification, the projector 200 recognizes that a service associated with the received area-in notification is the card service, and then performs steps S547 and S548. At steps S547 and S548, the projector 200 reads communication information of the card service from the communication information registration table 500, and acquires communication object data D from the service linkage management device 240 on the basis of the read communication information. Then, at step S550, the projector 200 establishes communication with the card management device 180 by executing a communication establishment process on the basis of the acquired communication object data D, and transmits a service linkage initiation request to the card management device 180.

The card management device 180 receives the service linkage initiation request and recognizes that a service associated with the received service linkage initiation request is the projector service. As a result, the card management device 180 performs a process corresponding to step S520 to read communication information of the projector service from the communication information registration table 500, and acquire communication object data A from the service linkage management device 240 on the basis of the read communication information. Then, at step S522, the card management device 180 establishes communication with the projector 200 by executing a communication establishment process on the basis of the acquired communication object data A, and initiates linkage with the projector service. If the linkage with the projector service is initiated, the card management device 180 transmits the operation command "NEXT" to the projector 200 through steps S568 and S570 due to the fact that the linked card service is associated with the card 160a.

Upon receiving the operation command "NEXT", the projector 200 turns the presentation in projection forward by one page through steps S704 and S706.

Next, in order to turn the presentation in projection backward by one page, the presenter brings the card 160b assigned the operation command "PRIOR" close to the projector 200. As a result, if the virtual object C' enters the area-in state with respect to the virtual object A, the virtual object management device 100 performs processes corresponding to steps S500 to S506 to read communication information from the communication information registration table 500 on the basis of service information of the projector 200, and acquire communication object data A from the service linkage management device 240 on the basis of the read communication information. Then, the virtual object management device 100 performs a process corresponding to step S508 to establish communication with the projector 200 by executing a communication establishment process on the basis of the acquired communication object data A, and notify the projector 200 of the area-in state.

Upon receiving the area-in notification, the projector 200 recognizes that a service associated with the received area-in notification is the card service, and then performs steps S547 and S548. At steps S547 and S548, the projector 200 reads communication information of the card service from the communication information registration table 500, and acquires communication object data D from the service linkage management device 240 on the basis of the read communication information. Then, at step S550, the projector 200 establishes communication with the card management device 180 by executing a communication establishment process on the basis of the acquired communication object data D, and transmits a service linkage initiation request to the card management device 180.

The card management device 180 receives the service linkage initiation request and recognizes that a service associated with the received service linkage initiation request is the projector service. As a result, the card management device 180 performs a process corresponding to step S520 to read communication information of the projector service from the communication information registration table 500, and acquire communication object data A from the service linkage management device 240 on the basis of the read communication information. Then, at step S522, the card management device 180 establishes communication with the projector 200 by executing a communication establishment process on the basis of the acquired communication object data A, and initiates linkage with the projector service. If the linkage with the projector service is initiated, the card management device 180 transmits the operation command "PRIOR" to the projector 200 through steps S568, S572, and S574 due to the fact that the linked card service is associated with the card 160b.

Upon receiving the operation command "PRIOR", the projector 200 turns the presentation in projection backward by one page through steps S704, S708, and S710.

Finally, in order to finish the presentation, the presenter departs from the projector 200 while carrying the portable terminal 140. If the virtual object B is separated from the virtual object A (i.e., the area-out state), the virtual object management device 100 performs steps S600 to S608. At steps S600 to S608, the virtual object management device 100 reads communication information from the communication information registration table 500 on the basis of the service information of the projector 200, and acquires communication object data A from the service linkage management device 240 on the basis of the read communication information. Then, at step S610, the virtual object management device 100 establishes communication with the projector 200 by executing a communication establishment process on the basis of the acquired communication object data A, and notifies the projector 200 of the area-out state.

Upon receiving the area-out notification, the projector 200 recognizes that a service associated with the received area-out notification is the PDA service, and then performs steps S614 and S616. At steps S614 and S616, the projector 200 reads communication information of the PDA service from the communication information registration table 500, and acquires communication object data B from the service linkage management device 240 on the basis of the read communication information. Then, at step S618, the projector 200 establishes communication with the portable terminal 140 by executing a communication establishment process on the basis of the acquired communication object data B, and transmits a service linkage termination request to the portable terminal 140 in the E-mail communication manner. At step S624, the projector 200 transmits a response to the area-out notification reception to the virtual object management device 100.

Upon receiving the service linkage termination request, the portable terminal 140 recognizes that a service associated with the received service linkage termination request is the projector service, and then terminates the linkage with the projector service at step S622.

On the other hand, the virtual object management device 100 receives the response to the area-out notification, and deletes the service ID of the projector service from the area-in management information of the PDA service at step S628. The virtual object management device 100 then manages the termination of linkage between the PDA service and the projector service.

As described above, the projection process can be performed by the projector 200 on the basis of the projector display data of the portable terminal 140 by bringing the portable terminal 140 close to the projector 200 to allow the virtual object B to enter the area-in state with respect to the virtual object A. In a similar manner, the printing service can be performed by the printer 220 on the basis of the projector display data of the portable terminal 140 by bringing the portable terminal 140 close to the printer 220 to allow the virtual object B to enter the area-in state with respect to the virtual object D.

Further, the projector 200 is operated by bringing the cards 160a and 160b close to the projector 200 to allow the virtual objects C and C' to enter the area-in state with respect to the virtual object A. In a similar manner, the printer 220 can be operated by bringing the cards 160a and 160b close to the printer 220 to allow the virtual objects C and C' to enter the area-in state with respect to the virtual object D.

As described above, in the present embodiment, when the projector 200 receives an area-in notification by the card service as the cards 160a and 160b are brought close to the projector 200, it transmits a service linkage initiation request to the card management device 180. When the projector 200 receives an operation command in accordance with the transmission of the service linkage initiation request, the projector 200 can perform a projection control in response to the received operation command. Upon receiving the service linkage initiation request, the card management device 180 transmits the operation command to the projector 200.

Thus, the projector 200 can be operated by simply bringing the cards 160a and 160b close to the area of the virtual object A or the vicinity thereof, as shown in FIG. 17. Accordingly, the projector 200 can be operated in a relatively simple manner, as compared to conventional cases. Since the cards 160a and 160b may be assigned different operation commands, respectively, they can be prepared to meet respective purposes for use by different users. FIG. 17 is a view for explaining an operation of the projector 200 by the cards 160a and 160b.

Also, in the present embodiment, the virtual object management device 100 is adapted to register object information regarding the shape and disposed position of the virtual object A in a manner corresponding to the projector 200, and object information regarding the shape and disposed position of the virtual object B in a manner corresponding to the portable terminal 140, respectively. The virtual object management device 100 can also be adapted to update the disposed position of the virtual object B on the basis of received positional information. Upon determining with reference to the virtual object management table 400 that the virtual object B overlaps with the virtual object A (i.e., the area-in state), the virtual object management device 100 transmits an area-in notification to the projector 200. Upon receiving the area-in notification, the projector 200 transmits a projector display data transmission request to the portable terminal 140, and receives projector display data transmitted in response to the transmission request. The projector 200 then executes a projection process by the projection device 82 on the basis of the received projector display data. The portable terminal 140 transmits positional information acquired from the positional information acquisition device 86 to the virtual object management device 100. The portable terminal 140 further transmits the projector display data to the projector 200 in response to the projector display data transmission request.

Accordingly, because the virtual objects A and B are created to have their own shapes and disposed positions and a determination is made as to whether the virtual object B is in the area-in state with respect to the virtual object A, service provision areas can be defined more clearly than those conventionally provided, thereby making it possible to provide different services in respective small unit areas, such as several meters. Further, a projection service provision area (the area of the virtual object A) and an area corresponding to the portable terminal 140 (the area of the virtual object B) are not limited to points, but have predetermined ranges, thereby enabling the presenter to easily receive the projection service. Moreover, the presenter can receive the projection service by merely taking the portable terminal 140 to the area of the virtual object A or the vicinity thereof. As a result, the presenter can relatively easily receive the projection service. Therefore, the projection service using projector display data responsive to the presenter can be provided under the condition that the presenter is uniquely identified to a certain degree. This is similarly applied to the use of the cards 160*a* and 16*b*.

Also, in the present embodiment, the projector 200 turns the presentation in projection forward by one page upon receiving the operation command "NEXT", while turning the presentation in projection backward by one page upon receiving the operation command "PRIOR". Accordingly, turning of pages can be achieved by simply bringing the cards 160*a* and 160*b* close to the area of the virtual object A or the vicinity thereof.

Also, in the present embodiment, the virtual object management device 100 transmits, to the portable terminal 140, an E-mail with a message indicating that operation authorization of the target device is settable when it determines that the virtual object B is in the area-in state with respect to the virtual object A. Upon receiving a response mail to the E-mail, the virtual object management device 100 sets the operation authorization of the projector 200. A projection is subsequently carried out by the projector 200 in accordance with the operation content of the portable terminal 140.

As a result, the portable terminal 140 can perform communications in a simple and load-reduced manner, so that it can be most suitably used as a medium adapted to detect the movement of the presenter. Also, the presenter can make the projector 200 perform a projection operation by merely moving close to the projector 200 while carrying the portable terminal 140, and transmitting the response mail to the E-mail with the message indicating that operation authorization of the target device is settable.

Also, in the present embodiment, the E-mail with the message indicating that operation authorization of the target device is settable contains the E-mail address of a response destination, that is, the virtual object management device 100. Therefore, the presenter can reduce the effort of using the projector 200 because it is required only to transmit a response to the E-mail address contained in the received E-mail.

Further, in the present embodiment, upon receiving the area-in notification, the projector 200 acquires communication object data B from the service linkage management device 240, and executes a communication establishment process on the basis of the acquired communication object data B to transmit the projector display data transmission request to the portable terminal 140.

Accordingly, as long as the service linkage management device 240 is accessible, the projector 200 can provide the projection service even though it does not have the communication object data B, thereby making it possible to additionally provide the projector 200 relatively easily irrespective of the model, number, and the like of the portable terminal 140. Furthermore, in the case where a plurality of portable terminals 140 are present, object data for communication with the portable terminals 140 can be managed in an integrated manner by the service linkage management device 240. This is similarly applied to the use of the cards 160*a* and 160*b*.

Further, in the present embodiment, the virtual object management device 100 is adapted to determine with reference to the virtual object management table 400 whether the virtual object B is in the area-in state with respect to the virtual object A.

Thus, because the area-in state determination is made in the virtual object management device 100, the amount of load to be processed on the portable terminal 140 can be reduced as compared with that when the area-in state determination is made in the portable terminal 140. This is similarly applied to the area-out state determination.

Further, in the present embodiment, the portable terminal 140 is adapted to store projector display data and transmit the stored projector display data. As a result, because the projector display data transmission is conducted in the portable terminal 140, the amount of load to be processed on the virtual object management device 100 can be reduced as compared with that when the projector display data transmission is conducted in the virtual object management device 100.

Also, in the present embodiment, although the above described configuration is adapted to achieve a projection by the projector 200 on the basis of projector display data from the portable terminal 140 by bringing the portable terminal 140 close to the projector 200, it should be understood that the present invention is not limited thereto. A configuration may be implemented in which the cards 160*a* and 160*b* are assigned projector display data so that a projection is achieved by the projector 200 on the basis of projector display data assigned to the cards 160*a* and 160*b* when the cards 160*a* and 160*b* are brought close to the projector 200.

In detail, the virtual object management device 100 is adapted to store object information regarding the shape and disposed position of the virtual object E in a manner corresponding to the cards 160*a* and 160*b*. Upon determining with reference to the object information of the virtual object management DB 42 that the virtual object E is in the area-in state with respect to the virtual object A, the virtual object management device 100 transmits an area-in notification to the projector 200. Upon receiving the area-in notification, the projector 200 transmits a projector display data transmission request to the card management device 180, and receives projector display data transmitted in response to the transmission request. The projector 200 then executes a projection process by the projection device 82 on the basis of the received projector display data. The card management device 180 further transmits the projector display data to the projector 200 in response to the projector display data transmission request.

Also, in the present embodiment, although the above described configuration is adapted to operate the projector 200 by bringing the cards 160*a* and 160*b* close to the projector 200, the present invention is not limited thereto. A configuration may be implemented in which the portable terminal 140 is assigned an operation command so that the projector is operated when the portable terminal 140 is brought close to the projector 200.

In detail, the projector 200 transmits a service linkage initiation request to the portable terminal 140 when it receives an area-in notification by the PDA service as the portable terminal 140 is brought close to the projector 200. When the projector 200 receives an operation command in accordance with the transmission of the service linkage initiation request, it performs a projection control in response to the received operation command. Upon receiving the service linkage initiation request, the portable terminal 140 transmits the operation command to the projector 200.

Also, in the present embodiment, although the above described configuration is adapted to operate the printer 220 by the cards 160a and 160b, another configuration may be implemented. In detail, as shown in FIG. 18, a configuration may be implemented in which when a card 160c assigned a designation of "A4" as paper size information, a card 160d assigned a designation of "lateral direction" as paper direction information, and a card 160e assigned printing data are brought close to the printer 220, thereby causing their virtual objects to be in an area-in state with respect to the virtual object D, a printing process is executed in the printer 220, based on the printing data assigned to the card 160e, in such a manner that the paper size corresponds to "A4", and the paper direction corresponds to the lateral direction. FIG. 18 is a view illustrating the other embodiment in which the printer 220 is operated by the cards 160c to 160e.

Further, in the present embodiment, although a system using only the cards 160a and 160b each assigned an operation command is implemented, the present invention is not limited thereto. Another system may be implemented in which there are both the card assigned an operation command and the card assigned projector display data. In detail, this system may be implemented in accordance with a process shown in the flow chart of FIG. 19. FIG. 19 is a flow chart illustrating a projector control process.

As shown in FIG. 19, the process first proceeds to step S800 to determine whether or not there is a card in an area-in state. When it is determined that there is a card in an area-in state (Yes), the process proceeds to step S802. However, when it is determined that there is no card in an area-in state (No), the process waits at step S800.

At step S802, it is determined whether or not the area-in card is assigned an operation command. When it is determined that there is an assigned operation command (Yes), the process proceeds to step S804 at which the operation command assigned to the card is executed. Thereafter, the process proceeds to step S800.

On the other hand, where it is determined at step S802 that there is no operation command assigned to the area-in card (No), the process proceeds to step S806 at which the settings assigned to the card are reflected. Thereafter, the process proceeds to step S800.

Also, in the present embodiment, although the above described configuration is adapted to operate the projector 200 when the cards 160a and 160b are brought close to the projector 200, thereby causing the virtual object C to be in an area-in state with respect to the virtual object A, it should be understood that the present invention is not limited thereto. Another configuration may be implemented, as shown in FIG. 20. That is, a search for the printer 220 is made when the card 160e assigned a printing command is brought close to the projector 200 so that it is in an area-in state with respect to the virtual object A. The printing command to print the display screen of the projector 200 is then transmitted to the printer 220 extracted in accordance with the search. FIG. 20 is a view illustrating the other embodiment in which the printer 220 is operated by the card 160e.

In detail, this embodiment may be implemented by a process illustrated in the flow chart of FIG. 21. FIG. 21 is an exemplary flow chart illustrating a projector control process.

As shown in FIG. 21, the process first proceeds to step S810 to determine whether or not the card 160e assigned printing data is in an area-in state. When it is determined that the card 160e assigned the printing data is in an area-in state (Yes), the process proceeds to step S812 to search the network for the printer 220. Thereafter, the process proceeds to step S814.

At step S814, it is determined whether or not the printer 220 is extracted in accordance with the search. When it is determined that the printer 220 is extracted (Yes), the process proceeds to step S816 at which the printing command to print the display screen of the projector 200 and the printing data of the display screen are transmitted to the printer 220. Thereafter, the process proceeds to step S810.

On the other hand, where it is determined at step S814 that the printer 220 is extracted by the search (No), or it is determined at step S810 that the card 160e assigned the printing data is not in an area-in state (No), the process proceeds to step S810.

Further, as another embodiment associated with the present embodiment, the following configuration may be proposed.

First, as shown in FIG. 22, a printing command can be assigned to the card 160 able to acquire a command or data when the card 160 is brought close to the printer 220, thereby causing the virtual object D to be in an area-in state. When the card 160 assigned the printing command is in an area-in state with respect to the virtual object A as it is brought close to the projector 200, the printer 220 is searched for. The printing command to print the display screen of the projector 200 is transmitted to the printer 220 extracted by the search. FIG. 22 is a view for explaining the case in which a printing command is assigned to the card 160.

In detail, this configuration can be implemented in accordance with a process illustrated in the flow chart of FIG. 23. FIG. 23 is an exemplary flow chart illustrating a projector control process.

As shown in FIG. 23, the process first proceeds to step S820 to determine whether or not the card 160 able to acquire a command or data is in an area-in state. When it is determined that the card 160 able to acquire a command or data is in an area-in state (Yes), the process proceeds to step S822 to assign a printing command to the card 160. Thereafter, the process proceeds to step S820.

On the other hand, it is determined at step S820 that the card 160 able to acquire a command or data is not in an area-in state (No), the process waits at step S820 until the card 160 is rendered to be in an area-in state.

Second, as shown in FIG. 24, the assignment of the operation command to the card 160 is carried out in such a manner that the operation command "NEXT" is assigned to the front surface of the card 160, whereas the operation command "PRIOR" is assigned to the back surface of the card 160. When the card 160 is rendered to be in an area-in state with respect to the virtual object A as it is brought close to the projector 200 under the condition in which the front surface of the card 160 faces upwardly, and the presentation in projection is turned forward by one page. On the other hand, when the card 160 is rendered to be in an area-in state with respect to the virtual object A as it is brought close to the projector 200 under the condition in which the back surface of the card 160 faces upwardly, and the presentation in projection is turned backward by one page. FIG. 24 is a view for explaining the case in which the operation content of the projector 200 is varied in accordance with the direction of the card 160.

In detail, this configuration can be implemented by a process illustrated in the flow chart of FIG. 25. FIG. 25 is an exemplary flow chart illustrating a projector control process.

As shown in FIG. 25, the process first proceeds to step S830 to determine whether or not the front surface of the card 160 in an area-in state faces upwardly. When it is determined that the front surface of the card 160 faces upwardly (Yes), the process proceeds to step S832 at which the operation command "NEXT" assigned to the front surface of the card 160 is executed. Subsequently, the process is completed to return an original process.

On the other hand, where it is determined at step S830 that the front surface of the card 160 does not face upwardly (No), the process proceeds to step S834 at which the operation command "PRIOR" assigned to the back surface of the card-160 is executed. Subsequently, the process is completed to return an original process.

Third, as shown in FIG. 26, the second configuration is applicable to the printer 220. For example, it may be possible to output, to the printer 220, a printing command for printing in a lateral direction of printing paper when the card 160 is rendered to be in an area-in state in such a manner that the longer-side direction of the card 160 corresponds to the entering direction, and the shorter-side direction of the card 160 corresponds to the vertical direction (in a lateral state) ①, while outputting, to the printer 220, a printing command for printing in a longitudinal direction of printing paper when the card 160 is rendered to be in an area-in state in such a manner that the longer-side direction of the card 160 corresponds to the vertical direction, and the shorter-side direction of the card 160 corresponds to the entering direction (in a longitudinal state) ②. It may also be possible to supply electric power to the printer (device) 220 when the card 160 is rendered to be in an area-in state in such a manner that the longer-side direction of the card 160 corresponds to the vertical direction, and the thickness direction of the card 160 corresponds to the entering direction (in a stand-up state) ③, while cutting off electric power supplied to the printer (device) 220 when the card 160 is rendered to be in an area-in state in such a manner that the longer-side direction of the card 160 corresponds to the entering direction, and the shorter-side direction of the card 160 corresponds to the horizontal direction (in a lay-down state) ④. FIG. 26 is a view for explaining the case in which the operation content of the projector 200 is varied in accordance with the direction of the card 160.

Also, in the present embodiment, although the communication system of the portable terminal 140 with the virtual object management device 100, projector 200, and printer 220 is configured using an E-mail system, it should be understood that the present invention is limited thereto. The communication system may be configured using HTTP (Hyper Text Transfer Protocol). In this configuration, the same effect as described above can be obtained.

Further, in the present embodiment, although the virtual object management device 100 has been disclosed to determine with reference to the virtual object management table 400 whether the virtual object B is in the area-in state with reference to the virtual object A, the present invention is not limited thereto. For example, the virtual object management table 400 may be installed in the portable terminal 140, and the portable terminal 140 may make the area-in state determination.

As a result, because the area-in state determination is conducted in the portable terminal 140, the amount of load to be processed on the virtual object management device 100 can be reduced as compared with that when the area-in state determination is conducted in the virtual object management device 100. This is similarly applied to the area-out state determination. Of course, the present invention is not limited thereto. For example, the area-in state determination may be made in the projector 200, printer 220, service linkage management device 240, or any other device.

Further, in the present embodiment, although the portable terminal 140 has been disclosed to transmit the projector display data, the present invention is not limited thereto. For example, the projector display data may be stored in the virtual object management device 100, and the virtual object management device 100 may transmit the projector display data.

Accordingly, the amount of load to be processed on the portable terminal 140 can be reduced owing to the fact that the projector display data transmission is conducted in the virtual object management device 100. Of course, the present invention is not limited thereto. For example, the projector display data transmission may be made in the projector 200, printer 220, service linkage management device 240, or any other device.

And in the present embodiment, the virtual object management device 100 and the service linkage management device 240 are provided independently. But the present invention is not limited like this. These two devices may be provided in one unit.

Further, in the present embodiment, although the object information and service information have been disclosed to be transmitted and received in a wireless communication manner, the present invention is not limited thereto. For example, the object information and service information may be transmitted and received over a network, or they may be stored in a storage medium, such as an IC card chip, two-dimensional barcode or the like, and transmitted and received via the storage medium.

Further, in the present embodiment, although the portable terminal 140 has been disclosed to pre-store the program for execution of the processes shown in the flow charts of FIGS. 13 to 15, the present invention is not limited thereto. For example, the portable terminal 140 may not have such a program, the virtual object management device 100 may transmit object information with the program contained therein, and the portable terminal 140 may interpret the object information and service information according to the execution of the received program by applying only positional information to the program.

Accordingly, a new service can be received by merely modifying the program of the virtual object management device 100 with no necessity for modifying the internal settings of the portable terminal 140.

Further, in the present embodiment, although the object information and the service information have been disclosed to be stored in the virtual object management device 100, the present invention is not limited thereto. For example, the object information and the service information may be stored respectively in different devices, and the virtual object management device 100 may store only access information (for example, shortcut information) for access to the object information and service information. The portable terminal 140 may acquire the access information from the virtual object management device 100, and obtain the object information and service information on the basis of the access information.

Further, in the present embodiment, although the control program pre-stored in the ROM 32 has been disclosed to be run to execute the processes shown in the flow charts of FIGS. 5 to 7, the present invention is not limited thereto. For example, a program indicative of the sequence of those processes may be stored in a storage medium, read from the storage medium out to the RAM 34 and then run.

Further, in the present embodiment, although the control program pre-stored in the ROM 72 has been disclosed to be run to execute the processes shown in the flow charts of FIGS. 9 and 10, the present invention is not limited thereto. For example, a program indicative of the sequence of those processes may be stored in a storage medium, read from the storage medium out to the RAM 74 and then run.

Further, in the present embodiment, although the control program pre-stored in the ROM 92 has been disclosed to be run to execute the processes shown in the flow charts of FIGS. 13 and 15, the present invention is not limited thereto. For example, a program indicative of the sequence of those processes may be stored in a storage medium, read from the storage medium out to the RAM 94 and then run.

Here, the storage medium may be a semiconductor storage medium, such as a RAM, ROM, or the like, a magnetic recoding-type storage medium, such as an FD, HD, or the like, an optical read-type storage medium, such as a CD, CDV, LD, DVD, or the like, or a magnetic recoding/optical read-type storage medium, such as an MO. That is, the storage medium may be any computer-readable storage medium irrespective of an electronic reading method, magnetic reading method, optical reading method, and the like Further, in the present embodiment, the operation control system, output service provision system, portable object management terminal, portable terminal, portable object management terminal program, and portable terminal program have been disclosed as being applied to the case where in the presentation meeting place, the sphere-shaped virtual object A is disposed and set in the area surrounding the projector 200, the virtual objects B and C are disposed and set in the area surrounding the portable terminal 140 and card 160a used by the presenter, and the projection service by the projector 200 is initiated on the basis of projector display data when the virtual objects A and B overlap with each other, or when the virtual objects A and C overlap with each other. However, the present invention is not limited thereto. For example, the operation control system, output service provision system, portable object management terminal, portable terminal, portable object management terminal program, and portable terminal program may also be applied to a different case without departing from the scope and spirit of the present invention.

As apparent from the above description, in accordance with an operation control system of the present invention, the controlled device can be operated by simply bringing a mobile object close to the area of a first virtual object or the vicinity thereof as long as a control command is previously assigned to the mobile object. Accordingly, the controlled device can be operated in a relatively simple manner, as compared to conventional cases. Since mobile objects may be assigned different operation commands, respectively, they can be prepared to meet respective purposes for use by different users. Further, according to the configuration in which virtual objects are created to have their own shapes and disposed positions, and a determination is made as to whether an area of the first virtual object and an area of the second virtual object overlap with each other, output service provision areas can be defined more clearly than those conventionally provided. Accordingly, it is possible to provide different output services in respective small unit areas, such as several meters. Further, an output service provision area and an area corresponding to a portable object are not limited to points, but have predetermined ranges, thereby enabling the user to easily receive services.

In accordance with an output service provision system of the present invention, the controlled device can be operated by simply bringing a portable object close to the area of a first virtual object or the vicinity thereof as long as a control command is previously assigned to the portable object. Accordingly, the controlled device can be operated in a relatively simple manner, as compared to conventional cases. Since portable objects may be assigned different operation commands, respectively, they can be prepared to meet respective purposes for use by different users. Further, according to the configuration in which virtual objects are created to have their own shapes and disposed positions, and a determination is made as to whether an area of the first virtual object and an area of the second virtual object overlap with each other, output service provision areas can be defined more clearly than those conventionally provided. Accordingly, it is possible to provide different output services in respective small unit areas, such as several meters. Further, an output service provision area and an area corresponding to a portable object are not limited to points, but have predetermined ranges, thereby enabling the user to easily receive services.

In accordance with an output service provision system of the present invention, it is also possible to obtain an effect capable of turning pages by merely bringing a portable object to the area of a first virtual object or the vicinity thereof.

In accordance with an output service provision system of the present invention, an output device can provide an output service even though it does not have means for establishment of communication with a portable object management terminal, as long as it can gain access to a communication service provision terminal, thereby making it possible to additionally provide the output device relatively easily irrespective of the model, number, and the like of the portable object management terminal. Furthermore, in the case where a plurality of portable object management terminals are present, means for establishment of communication with the portable object management terminals can be managed in an integrated manner by the communication service provision terminal.

In accordance with an output service provision system of the present invention, the output device can be operated by simply bringing a portable terminal close to the area of a first virtual object or the vicinity thereof as long as a control command is previously assigned to the portable terminal. Accordingly, the output device can be operated in a relatively simple manner, as compared to conventional cases. Since portable terminals may be assigned different operation commands, respectively, they can be prepared to meet respective purposes for use by different users. Further, according to the configuration in which virtual objects are created to have their own shapes and disposed positions, and a determination is made as to whether an area of the first virtual object and an area of the second virtual object overlap with each other, output service provision areas can be defined more clearly than those conventionally provided. Accordingly, it is possible to provide different output services in respective small unit areas, such as several meters. Further, an output service provision area and an area corresponding to a portable object are not limited to points, but have predetermined ranges, thereby enabling the user to easily receive services.

On the other hand, according to a portable object management terminal of the present invention, the same effect as that of the output service provision system described above can be obtained.

And, according to a portable terminal of the present invention, the same effect as that of the output service provision system described above can be obtained.

And, according to a portable object management terminal program of the present invention, the same effect as that of the virtual object management terminal described above can be obtained.

What is claimed is:

1. An operation control system including a first virtual object corresponding to a controlled device that is operated in response to a given control command, and a second virtual object corresponding to a mobile object, respectively, said first virtual object being disposed in a virtual space corresponding to a real space and said second virtual object being disposed at a position of said mobile object in said virtual space or a vicinity thereof, respectively, and said controlled device being operated corresponding to said first virtual object on the basis of a positional relation between said first virtual object and said second virtual object, the operation control system comprising:

a first storage device that stores first object information regarding a shape and disposed position of said first virtual object in a manner corresponding to said controlled device;

a second storage device that stores second object information regarding a shape and disposed position of said second virtual object in a manner corresponding to said mobile object;

a control command storage device that stores control commands for the operation of said controlled device in a manner corresponding to said mobile object; and a positional information acquisition device that acquires positional information specifying the position of said mobile object;

said second object information in said second storage device being updated on the basis of said positional information acquired by said positional information acquisition device, and giving a control command corresponding to said mobile object as said second virtual object, among said control commands in said control command storage device, to said controlled device as said first virtual object upon determining, on the basis of said first object information in said first storage device and said second object information in said second storage device, that an area specified by said shape and disposed position of said first virtual object is overlapped with an area specified by said shape and disposed position of said second virtual object;

said controlled device being operated in response to said given control command.

2. The operation control system as set forth in claim 1, the output device being a projection-type display device.

3. An output service provision system for interconnecting a virtual object management terminal managing virtual objects, an output device, and a portable object management terminal managing a portable object for communication, including a first virtual object corresponding to said output device and a second virtual object corresponding to said portable object, respectively, said first virtual object being disposed in a virtual space corresponding to a real space and said second virtual object being disposed at a position of said portable object in said virtual space or the vicinity thereof, respectively, and an output service associated with an output of said output device corresponding to said first virtual object being provided on the basis of a positional relation between said first virtual object and said second virtual object, the output service provision system comprising:

a positional information acquisition device that acquires positional information specifying a position of said portable object;

said virtual object management terminal including a first storage device that stores first object information regarding a shape and disposed position of said first virtual object in a manner corresponding to said output device, and a second storage device that stores second object information regarding a shape and disposed position of said second virtual object in a manner corresponding to said portable object, and is adapted to update said second object information in said second storage device on the basis of said positional information acquired by said positional information acquisition device, and transmit a provision request to provide said output service associated with the output of said output device corresponding to said first virtual object, upon determining, on the basis of said first object information in said first storage device and said second object information in said second storage device, that an area specified by said shape and disposed position of said first virtual object is overlapped with an area specified by said shape and disposed position of said second virtual object;

said portable object management terminal including a control command storage device that stores control commands for the operation of said output device in a manner corresponding to said portable object, and is adapted to, upon receiving said provision request, transmit a control command corresponding to said portable object associated with the received provision request, among said control commands in said control command storage, to said output device associated with the received provision request; and said output device, upon receiving the transmitted control command, is operated in response to the received control command.

4. The output service provision system as set forth in claim 3, said transmitted control command being a page turning command for a page turning operation; and said output device including a display device, and is adapted to, upon being given display data, conduct a page-unit display on said display device on the basis of the given display data, and to, upon receiving said page turning command, turn pages displayed on said display device in response to the received page turning command.

5. The output service provision system as set forth in claim 4, said transmitted control command being a forward page turning command prescribing turning pages forward; and said output device being adapted to, upon receiving said forward page turning command, turn said pages displayed on said display device forward in response to the received forward page turning command.

6. The output service provision system as set forth in claim 4, said transmitted control command being a backward page turning command prescribing turning pages backward; and said output device being adapted to, upon receiving said backward page turning command, turn said pages displayed on said display device backward in response to the received backward page turning command.

7. The output service provision system as set forth in claim 4, said system being further communicatably connected with a portable terminal;

said virtual object management terminal including a third storage device that stores third object information regarding a shape and disposed position of a third virtual object in a manner corresponding to said portable terminal, and is adapted to transmit said provision request to provide said output service associated with the output of said output device corresponding to said first virtual object, upon determining, on the basis of said first object information in said first storage device and said third object information in said third storage device, that said area specified by said shape and disposed position of said first virtual object is overlapped with an area specified by said shape and disposed position of said third virtual object; and said portable terminal including a display data storage device that stores said display data, and is adapted to, upon receiving said provision request, transmit said display data in said display data storage device to said output device associated with the received provision request.

8. The output service provision system as set forth in claim 4, said virtual object management terminal further including a third storage device that stores third object information regarding a shape and disposed position of a third virtual object in a manner corresponding to a second portable object, and is adapted to transmit a provision request to provide said output service associated with the output of said output device corresponding to said first virtual object, upon determining, on the basis of said first object information in said first storage device and said third object information in said third storage device, that said area specified by said shape and disposed position of said first virtual object is overlapped with an area specified by said shape and disposed position of said third virtual object; and said portable object management terminal further including a display data storage device that stores said display data in a manner corresponding to said second portable object, and is adapted to, upon receiving said provision request, transmit display data corresponding to said second portable object associated with the received provision request, among said display data in said display data storage device, to said output device associated with the received provision request.

9. The output service provision system as set forth in claim 3, said portable object management terminal being connected with a communication service provision terminal in a communicatable manner, said communication service provision terminal providing a service for communication with said portable object management terminal;

said communication service provision terminal including a constituent information storage device that stores communication establishment means constituent information, said constituent information storage device constituting a communication establishment device that establishes communication with said portable object management terminal;

said virtual object management terminal being adapted to transmit said provision request to said output device corresponding to said first virtual object upon determining that said area specified by said shape and disposed position of said first virtual object is overlapped with said area specified by said shape and disposed position of said second virtual object;

said output device being adapted to, upon receiving said provision request, acquire said communication establishment means constituent information from said communication service provision terminal, constitute said communication establishment device on the basis of the acquired communication establishment means constituent information and transmit the received provision request to said portable object management terminal associated with said provision request on the basis of the constituted communication establishment means constituent information; and said portable object management terminal being adapted to, upon receiving said provision request, transmit a control command corresponding to said portable object associated with the received provision request, among said control commands in said control command storage device, to said output device associated with the received provision request.

10. The output service provision system as set forth in claim 3, further comprising a portable object management terminal communicatably connected with the virtual object management terminal and the output device, the portable object management terminal comprising:

a control command storage device that stores control commands for the operation of said output device in a manner corresponding to said portable object;

upon receiving said provision request, the control command storage device transmits a control command corresponding to said portable object associated with the received provision request, among said control commands in said control command storage device, to said output device associated with the received provision request.

11. A portable object management terminal program run in the portable object management terminal, as a computer, as set forth in claim 10, the portable object management terminal program comprising:

a process of, upon receiving said provision request, transmitting a control command corresponding to said portable object associated with the received provision request, among said control commands in said control command storage device, to said output device associated with the received provision request.

12. The output service provision system as set forth in claim 3, the output device being a projection-type display device.

13. An output service provision system for interconnecting a virtual object management terminal managing virtual objects, an output device, and a portable terminal in a communicatable manner, including a first virtual object corresponding to said output device and a second virtual object corresponding to said portable terminal, respectively, said first virtual object being disposed in a virtual space corresponding to a real space and said second virtual object being disposed at a position of said portable terminal in said virtual space or the vicinity thereof, respectively, and providing an output service associated with an output of said output device corresponding to said first virtual object on the basis of a positional relation between said first virtual object and said second virtual object, the output service provision system comprising:

a positional information acquisition device that acquires positional information specifying the position of said portable terminal;

said virtual object management terminal including a first storage device that stores first object information regarding a shape and disposed position of said first virtual object in a manner corresponding to said output device, and a second storage device that stores second object information regarding a shape and disposed position of said second virtual object in a manner corresponding to said portable terminal, and being adapted to update said second object information in said second storage device on the basis of said positional information acquired by said positional information acquisition device, and transmit a provision request to provide said output service associated with the output of said output device corresponding to said first virtual object, upon determining, on the basis of said first object information in said first storage device and said second object information in said second storage device, that an area specified by said shape and disposed position of said first virtual object is overlapped with an area specified by said shape and disposed position of said second virtual object;

said portable terminal including a control command storage device that stores a control command for the operation of said output device, and is adapted to, upon receiving said provision request, transmit said control command in said control command storage device to said output device associated with the received provision request; and said output device, upon receiving the transmitted control command, being operated in response to the received control command.

14. The output service provision system as set forth in claim 13, said output device being a projection-type display device.

15. The output service provision system as set forth in claim 13, further comprising a portable terminal communicatably connected with the virtual object management terminal and the output device, the portable terminal comprising:

a control command storage device that stores a control command for the operation of said output device;

upon receiving said provision request, the control command storage device transmits said control command in said control command storage device to said output device associated with the received provision request.

16. A portable terminal program run in the portable terminal, as a computer, as set forth in claim 15, the portable terminal program comprising:

a process of, upon receiving said provision request, transmitting said control command in said control command storage device to said output device associated with the received provision request.

* * * * *